US011852771B1

(12) United States Patent
Tian et al.

(10) Patent No.: US 11,852,771 B1
(45) Date of Patent: Dec. 26, 2023

(54) METHOD AND SYSTEM FOR OPTIMALLY SELECTING CARBON STORAGE SITE BASED ON MULTI-FREQUENCY BAND SEISMIC DATA AND EQUIPMENT

(71) Applicant: Institute of Geology and Geophysics, Chinese Academy of Sciences, Beijing (CN)

(72) Inventors: Fei Tian, Beijing (CN); Jiangyun Zhang, Beijing (CN); Wang Zhang, Beijing (CN); Wenhao Zheng, Beijing (CN); Xiaocai Shan, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/902,842

(22) Filed: Sep. 4, 2022

(30) Foreign Application Priority Data

Aug. 2, 2022 (CN) .......................... 202210919676.5

(51) Int. Cl.
*G01V 1/48* (2006.01)
(52) U.S. Cl.
CPC .......... *G01V 1/48* (2013.01); *G01V 2210/514* (2013.01); *G01V 2210/53* (2013.01)
(58) Field of Classification Search
CPC . G01V 1/48; G01V 2210/514; G01V 2210/53
See application file for complete search history.

(56) References Cited

FOREIGN PATENT DOCUMENTS

| CN | 102466816 | A | * | 5/2012 | |
|---|---|---|---|---|---|
| CN | 104391319 | A | * | 3/2015 | |
| CN | 104391319 | A | | 3/2015 | |
| CN | 104536042 | A | * | 4/2015 | |
| CN | 104536042 | A | | 4/2015 | |
| CN | 107390271 | A | * | 11/2017 | ............. G01V 1/362 |

(Continued)

OTHER PUBLICATIONS

Wayne Pennington et. al., "Calibration of Seismic Attributes for Reservoir Characterization". Sep. 30, 2002, pp. 1-185; Michigan Technological University (Year: 2002).*

*Primary Examiner* — Michael J Dalbo
*Assistant Examiner* — Kaleria Knox
(74) *Attorney, Agent, or Firm* — Nitin Kaushik

(57) ABSTRACT

The invention belongs to the field of environmental monitoring, and in particular relates to a method for optimally selecting a carbon storage site based on multi-frequency band seismic data. The method comprises the steps of: performing seismic wavelet spread spectrum simulation based on three-dimensional post-stack seismic data to obtain spread spectrum simulated wavelets; building an isochronous stratigraphic framework model of a target horizon, and calculating the geometric structure and spatial distribution of a fault-karst; then performing waveform-indicated inversion to obtain a wave impedance inversion data volume, and obtaining a stable stratum wave impedance data volume through a virtual well cross-well wave impedance interpolation; calculating the difference between the stable stratum wave impedance data volume and the wave impedance inversion data volume to obtain an abnormal wave impedance data volume, then obtaining a fault-karst reservoir bed interpretation model, and determining the position of a carbon storage box.

9 Claims, 9 Drawing Sheets

(56) References Cited

FOREIGN PATENT DOCUMENTS

| | | | | |
|---|---|---|---|---|
| CN | 107390271 | A | | 11/2017 |
| CN | 111399048 | A | * | 7/2020 |
| CN | 112698382 | A | * | 4/2021 |
| CN | 112698392 | A | * | 4/2021 |

* cited by examiner

METHOD AND SYSTEM FOR OPTIMALLY SELECTING CARBON STORAGE SITE BASED ON MULTI-FREQUENCY BAND SEISMIC DATA AND EQUIPMENT

CROSS-REFERENCE TO RELATED APPLICATIONS

The application claims priority to Chinese patent application No. 202210919676.5, filed on Aug. 2, 2022, the entire contents of which are incorporated herein by reference.

TECHNICAL FIELD

The present invention belongs to the field of capture, utilization, and storage of carbon dioxide, and particularly relates to a method and a system for optimally selecting a carbon storage site based on multi-frequency band seismic data, and equipment.

BACKGROUND

In order to achieve the goal of controlling global temperature rise, a carbon capture, utilization, and storage (CCUS) technology can store carbon dioxide generated during the use of fossil energy underground, thereby reducing the content of the carbon dioxide in the atmosphere, which is of great significance for slowing down global warming. At present, carbon dioxide storage methods mainly include geological storage, marine storage, chemical storage, and the like.

Among them, geological storage stores the carbon dioxide underground in a supercritical state by means of injecting the carbon dioxide into oil and gas reservoirs, deep saline aquifers, basalt, unworkable coal seams, and the like. This method can achieve the permanent storage of carbon dioxide under certain conditions.

Carbon dioxide storage in oil and gas industries has natural advantages. Using the oil and gas reservoirs to store the carbon dioxide can not only reduce the concentration of carbon dioxide in the atmosphere, but also slows down the greenhouse effect. At the same time, the carbon dioxide can be injected into oil and gas wells being in production to achieve the purposes of driving oil and increasing crude oil production, which has good economic benefits.

The theoretical research and practice show that at present, geological bodies that can be used for the geological storage of carbon dioxide mainly include the oil and gas reservoirs, the deep saline aquifers, the basalt, the unworkable coal seams, and the like, wherein compared with other geological bodies, the oil and gas reservoirs have the advantage that the leakage risk of the carbon dioxide stored in the oil and gas reservoirs is the smallest due to the good sealing property of the oil and gas reservoirs, and as production wells and injection wells have been deployed in the oil and gas reservoirs, carbon dioxide storage is more convenient and economic benefits are better.

In carbonate rock sedimentary basins, multiple tectonic movements form criss-cross strike-slip fractured zones, and stress is concentrated in the strike-slip shearing process, accompanied by the development of densely distributed fractures and broken areas. A large number of karst caves, fractures, and dissolution caves of different shapes and sizes have been formed on both sides of faults through atmospheric dissolution and hydrothermal dissolution. Under the sealing of overlying marl, mudstone, and other caprocks and the cover of lateral dense limestones, a fault-karst trap composed of irregular fractured-cave bodies is formed, has a good sealing property, is an important reservoir space for oil and gas resources, and also provides natural sites, namely, carbon storage boxes for carbon dioxide storage.

However, the carbon storage boxes developed near the fault zones are complex in distribution and have various geometric structures. How to accurately locate and identify the spatial geometric structures of the carbon storage boxes, analyze the carbon dioxide reservoir space and evaluate the storage performance is the main research direction of CCUS.

To solve this technical problem, the present invention can realize the positioning and structural characterization of the carbon storage boxes by a geophysical means combining well logging and seismic data according to the seismic wave impedance difference between the carbon storage boxes and the surrounding rocks, and provides technical support for the evaluation of the carbon dioxide reservoir space and the storage performance.

SUMMARY

In order to solve the above problems in the prior art that as fault-karst developed near the fractured zones is complex in distribution and has various geometric structures, it is difficult to accurately locate and identify the spatial geometric structures of carbon storage boxes to assist carbon dioxide storage, the present invention provides a method for optimally selecting a carbon storage site based on multi-frequency band seismic data, which comprises:

obtaining original seismic data and well logging data of a known well site, and then obtaining near-well geological interpretation results and three-dimensional post-stack seismic data; based on the three-dimensional post-stack seismic data, obtaining the depth data of a maker layer of a target horizon and the isochronous three-dimensional distribution of the marker layer;

based on the well logging data, eliminating the abnormal values and performing standardized pretreatment to obtain standardized well logging data;

based on the three-dimensional post-stack seismic data, performing seismic wavelet spread spectrum simulation to obtain spread spectrum simulated wavelets;

based on the spread spectrum simulated wavelets, building an isochronous stratigraphic framework model of a target horizon, and calculating the geometric structure and spatial distribution of the fault-karst;

based on the three-dimensional post-stack seismic data and the spread spectrum simulated wavelets, performing multi-scale decomposition to obtain multi-scale Bimf components of the seismic data;

based on the spread spectrum simulated wavelets and standardized well logging data, performing well-to-seismic calibration and ignoring small-scale Bimf components in the multi-scale Bimf components of the seismic data, thereby obtaining the time-depth conversion relationship;

based on the well logging data, the frequency-boosted seismic data, and the time-depth conversion relationship, and on the basis of stratigraphic trend information provided by the isochronous stratigraphic framework model, performing waveform-indicated seismic wave impedance inversion to obtain a wave impedance inversion data volume;

based on the three-dimensional post-stack seismic data, calculating a three-dimensional variance attribute volume, delimiting a sedimentary stable area, selecting a virtual-well site based on the sedimentary stable area, and obtaining a stable stratum wave impedance data volume through a virtual well cross-well wave impedance interpolation;

calculating the difference between the stable stratum wave impedance data volume and the wave impedance inversion data volume to obtain the abnormal wave impedance data volume, and highlighting the influence of the fault zone on the wave impedance of the stable sedimentary strata, highlighting the influence of fractured zones on the wave impedance of stable sedimentary strata; and by removing areas lower than the average value in the three-dimensional variance attribute volume, retaining the abnormal wave impedance data in the spatial geometric contour of the fault-karst to obtain a fault-karst wave impedance data volume including the geometric structure and internal wave impedance characteristics of the fault-karst;

comparing the near-well geological interpretation result with the fault-karst wave impedance data volume, delineating a characteristic value interval of a cave reservoir, a characteristic value interval of a crack fractured zone, and a characteristic value interval of surrounding rock, and obtaining a fault-karst reservoir bed interpretation model; and according to a fault-karst reservoir bed interpretation model, calculating migration and reservoir space after carbon dioxide injection, and finding a trap structure with a preset size threshold value, so that the migration and reservoir space where the injected carbon dioxide is stored in a high-density free phase under the conditions of being blocked by the tight carbonate rocks at the side of the fault zone and sealed by a top marl cover coat is selected as the position of the carbon storage box.

In some preferred embodiments, a method of obtaining a spread spectrum simulated wavelet comprises:

expressing a seismic record convolution model of the original seismic data in a frequency domain as:

$$s(\omega)=\sigma(\omega)\varepsilon(\omega)$$

where, $s(\omega)$ represents the seismic record frequency spectrum after Fourier transformation, $\sigma(\omega)$ represents the seismic wavelet frequency spectrum after Fourier transformation, $\varepsilon(\omega)$ represents the reflection coefficient frequency spectrum after Fourier transformation, and $\omega$ represents the angular frequency;

transforming the expression of the seismic record convolution model in the frequency domain into the expression in the frequency domain of a seismic record linear system:

$$\ln s(\omega)=\ln\sigma(\omega)+\ln\varepsilon(\omega)$$

where, $\ln s(\omega)$ is the expression in the frequency domain of the seismic record linear system, $\ln\sigma(\omega)$ is the expression in the frequency domain of a seismic wavelet linear system, and $\ln\varepsilon(\omega)$ is the expression in the frequency domain of a reflection coefficient linear system;

Fourier transformation is:

$$\tilde{s}(t)=\tilde{\sigma}(t)+\tilde{\varepsilon}(t)$$

where, $\tilde{s}(t)$ represents a complex cepstrum sequence of a seismic record frequency spectrum, $\tilde{\sigma}(t)$ represents a complex cepstrum sequence of a seismic wavelet frequency spectrum, $\tilde{\varepsilon}(t)$ represents a complex cepstrum sequence of a reflection coefficient spectrum, and t represents the arrival time of seismic waves;

separating the wavelet complex cepstrum sequence and the reflection coefficient complex cepstrum sequence in a complex cepstrum by a low-pass filter to extract wavelet amplitude;

based on the wavelet amplitude, simulating a seismic wavelet amplitude spectrum by the least square method:

$$\sigma(f)=A(f)f^{\alpha}e^{H(f)}$$

where, $\alpha$ represents a constant greater than or equal to 0, $\sigma(f)$ represents the seismic wavelet frequency spectrum, which is obtained from the Fourier transform of $\sigma(t)$, and $H(f)$ and $A(f)$ are polynomials about the frequency f to be solved, which are used to fit the seismic wavelet amplitude spectrum;

obtaining the maximum phase component and the minimum phase component of the wavelet based on the simulated seismic wavelet amplitude spectrum;

letting the maximum phase component of the wavelet $\sigma(t)$ be $u(t)$ and the minimum phase component be $\sigma(t)$, then the wavelet $v(t)$ is:

$$\sigma(t)=u(t)\cdot v(t)$$

the complex cepstrum of the amplitude spectrum is expressed as:

$$2\widetilde{\sigma_0}(t)=\tilde{u}(t)+\tilde{v}(t)+\tilde{u}(-t)+\tilde{v}(-t)$$

where, the complex cepstrum $\widetilde{\sigma_0}(t)$ of the amplitude spectrum is symmetrically displayed on positive and negative axes of the complex cepstrum, $\tilde{v}(-t)$ is the complex cepstrum of the minimum phase function corresponding to the maximum phase component $u(t)$ of the seismic wavelet, and $\tilde{v}(-t)$ is the complex cepstrum of the maximum phase function corresponding to the minimum phase component of the seismic wavelet; and determining a set of mixed-phase wavelet sets with the same amplitude spectrum based on the complex cepstrum of the amplitude spectrum, adjusting Yu wavelet parameters, raising the main frequency by keeping the low frequency and expanding the high frequency on the premise of ensuring the integrity of the main frequency of the seismic wavelet, and raising the effective bandwidth to the preset bandwidth threshold to obtain the spread spectrum simulated wavelets.

In some preferred embodiments, a method of obtaining Bimf components of the seismic data comprises:

setting an initial pre-stack gather matrix;

$$r_0(x,y)=U(x,y)$$

where, x is the matrix row coordinate, y is the matrix column coordinate, U is the value of the post-stack three-dimensional seismic data, and $r_0$ is the matrix element value;

setting a variable l as the number of decomposed Bimf layers, and the initial value of l to 1, defining an initialization matrix variable as h, and obtaining a variable matrix $h(x, y)$ as follows:

$$h(x,y)=r_{l-1}(x,y)$$

calculating the local maximum matrix and local minimum matrix about $h(x, y)$;

observing with an observation matrix of a preset size in the variable matrix, extracting the element value in the observation matrix, and obtaining the maximum value of the observation matrix, wherein the small matrix with the preset size of 4×4 can be used for observation;

sliding the observation matrix until the center of the observation matrix traverses all matrix variables h, assigning the measured maximum value of the observation matrix to the central element position of the corresponding observation matrix to obtain a local maximum matrix Max(x, y);

obtaining the minimum value in the observation matrix by setting the observation matrix, and then obtaining a local minimum matrix Min(x, y);

obtaining the maximum envelope surface and the minimum envelope surface by a spline interpolation method;

the interpolation formula is:

$$N(i+m,j+n)=ABC$$

where, A, B, and C represent an interpolation transition matrix:

$$A = [\delta(1+m) \quad \delta(m) \quad \delta(1-m) \quad \delta(2-m)]$$

$$B = \begin{bmatrix} \text{Max}(i-1, j-2) & \text{Max}(i, j-2) & \text{Max}(i+1, j-2) & \text{Max}(i+2, j-2) \\ \text{Max}(i-1, j-1) & \text{Max}(i, j-1) & \text{Max}(i+1, j-1) & \text{Max}(i+2, j-1) \\ \text{Max}(i-1, j) & \text{Max}(i, j) & \text{Max}(i+1, j) & \text{Max}(i+2, j) \\ \text{Max}(i-1, j+1) & \text{Max}(i, j+1) & \text{Max}(i+1, j+1) & \text{Max}(i+2, j+1) \end{bmatrix}$$

$$C = [\delta(1+n) \quad \delta(n) \quad \delta(1-n) \quad \delta(2-n)]$$

where, u and v are preset values greater than 0 and less than 1, and δ is the spread spectrum simulated wavelet;

obtaining $N_{Max}$ as the maximum envelope surface, replacing the local maximum matrix Max(x, y) in a transition formula B with the local minimum matrix Miri(x, y), and obtaining Min(x, y) as the minimum envelope surface; calculating the average value of the maximum envelope surface and the minimum envelope surface to obtain the intermediate transition quantity;

$$m_{l-1}(x,y)=[N_{max}(x,y)+\text{Min}(x,y)]/2$$

subtracting the intermediate transition quantity from the variable matrix h(x, y) to obtain the Bimf components of the J-th layer corresponding to the seismic data;

$$\text{Bimf}_l(x,y)=h(x,y)-m_{l-1}(x,y)$$

obtaining the margin $r_{l-1}$ as an input variable for calculating the Bimf components of the next layer;

$$r_l(x,y)=r_{l-1}(x,y)-\text{Bimf}_l(x,y)$$

where, $r_l$ represents the margin of the l-th layer, l–1 represents the margin of the l–1-th layer, and the margin of l–1-th layer serves as an input variable for calculating the Bimf components of the l-th layer;

calculating the Bimf components iteratively until the termination condition is met:

$$\sum_{x=1}^{M} \sum_{y=1}^{N} \left[ \frac{|\text{Bimf}_l(x, y) - \text{Bimf}_{l-1}(x, y)|^2}{\text{Bimf}_{l-1}^2(x, y)} \right] \leq r;$$

and obtaining the multi-scale Bimf components of the seismic data, where, r is the preset termination threshold.

In some preferred embodiments, a method of obtaining a time-depth conversion relationship comprises:

performing product operation based on a sonic time difference curve and a density curve in the well logging data of each known well site to obtain a wave impedance curve, and further calculating a reflection coefficient curve; constructing a Ricker wavelet on the basis of the main seismic frequency of a target interval, and performing convolution calculation of the Ricker wavelet and the reflection coefficient curve to obtain the synthetic seismic record;

making the depth data of the maker layer at the wellbore of each drilling well position correspond to the isochronous three-dimensional distribution of the maker layer, calculating the correlation between the synthetic seismic record and the spread spectrum simulated wavelets of a seismic trace near the well, when the waveform correlation is higher than the first correlation threshold, and the preliminary well-to-seismic calibration is completed to obtain the preliminary time-depth conversion relationship between the well logging depth and the two-way travel time of seismic reflection waves;

$$T_d = T_{H_0} + 2\sum_{i=1}^{n} T_i \cdot \Delta H$$

where, $T_{H_0}$ represents the two-way travel time of the seismic data corresponding to the depth of the sonic well logging marker layer; $T_i$ represents the sonic time difference; $\Delta H$ represents the well logging curve data sampling interval; $T_d$ represents the two-way travel time of the seismic wave;

adding the Bimf components of the seismic data step by step in descending order of scale to obtain updated effective seismic data;

adding a Bimf component every time to obtain the updated effective seismic data, and calculating the second correlation between the synthetic seismic records after one time updating and the effective seismic data;

as the Bimf components are gradually added to the effective seismic data, the second correlation shows an upward trend at first, and when the second correlation shows a downward trend, the updated synthetic seismic record at the peak of the second correlation and the updated earthquake are taken to calculate the second time-depth conversion relationship; and taking the second time-depth conversion relationship as the finally measured time-depth conversion relationship.

In some preferred embodiments, a method of obtaining a wave impedance inversion data volume comprises:

based on the spread spectrum simulated wavelets, calculating the waveform correlation between the waveform of the seismic trace to be discriminated and the synthetic seismic record of the known well, and establishing an initial model according to the wave impedance curve corresponding to the well with the highest waveform correlation;

using white noise to satisfy the law of Gaussian distribution, and expressing the wave impedance data in well logging data as:

$$Y_{sim}=X_{sim}+\xi$$

where, $Y_{sim}$ represents the well logging wave impedance curve, $X_{sim}$ represents the actual wave impedance value of the underground stratum to be solved, and $\xi$ represents random noise;

according to the central limit theorem, $\|X_{sim}-X_p\|^2$ also satisfies the Gaussian distribution, determining the initial objective function as:

$$J_1 = \frac{\|X_{sim} - X_p\|^2}{2\sigma^2}$$

where $J_1$ represents the function related to posterior information, $X_p$ represents the selection of a wave impedance curve of a sample well to a sample well based on the optimal number of samples, after matched filtering, posterior probability statistical distribution density is obtained, then the expected wave impedance value is calculated, and $\sigma$ represents the covariance of white noise;

based on the initial objective function, introducing prior information into the objective function through maximum posterior estimation to obtain a stable objective function as follows:

$$J(Z_{sim})=J_1(Z_{sim})+\lambda^2 J_2(Z_{sim})$$

where, $Z_{sim}$ represents the characteristic parameter to be simulated, $J_2$ represents the function related to the prior information of geological and well logging data, and $\lambda$ represents the smoothing parameter used to coordinate the interaction between $J_1$ and $J_2$; and taking the stable objective function as the input of the initial model, sampling the posterior probability distribution by a Markov chain Monte Carlo method (MCMC) and Metropolis-Hastings sampling criterion, continuously optimizing the parameters of the initial model, selecting the solution when the objective function takes the maximum value as a value randomly realized, taking the average value randomly realized many times as the expected value output, and taking the expected value output as the wave impedance inversion data volume.

In some preferred embodiments, a method of obtaining a stable stratum wave impedance data volume specifically comprises:

delineating grids with preset sizes based on the sedimentary stable area, and taking each grid node as a virtual well site;

letting the unknown underground wave impedance model parameter m be the g-dimensional space vector $m=\{m_1, \ldots, m_g\}$;

through an earthquake acquisition process, obtaining the observation data D as a K-dimensional data vector $d=\{d_1, \ldots, d_k\}$;

through a nonlinear function kernel G, establishing an unknown underground wave impedance model parameter, and establishing the relationship between the parameter and the K-dimensional data vector to obtain a forward model:

$$d=G(m)+n$$

where, $n=\{n_1, \ldots, n_r\}$ represents random noise independent of the underground wave impedance model parameter m, which obeys Gaussian distribution;

constructing the inversion objective function based on the forward model:

$$\min F[d,G(m)]=\min\|d,G(m)\|_2^2$$

where, F is the mean square error between the observation data d and the predicted data G(m);

performing linearized solution on the inversion objective function;

performing Taylor expansion on the forward model and omitting higher-order terms of more than quadratic to obtain a brief expression of prediction data:

$$\Delta G(m)=G(m)-G(m^0)=A\Delta m=A(m-m^0),$$

where, $m^0$ represents the initial model established according to prior information, A is a Jacobian matrix, and the element of A is first-order partial differential $\partial G_i/\partial m_j$;

letting $d_0=G(m_0)+\xi$, $\Delta d=d-d_0$, then the iterative equation of the forward model is:

$$m^{t+1}=m_t+\Delta m,$$

where, m k represents the forward model after iteration t times, $m^{k+1}$ represents the forward model after iteration k+1 times, and $d_0$ is the noise-adding predicted data;

obtaining a pre-stack depth and an offset seismic profile d' through a seismic acquisition process, assuming that the inversion depth domain model parameters have prior probability distribution P(M=m), according to Bayesian formula, the probability distribution is as follows:

$$P(M = m|D = d) = \frac{P(D = d|M = m)P(M = m)}{P(D = d)}$$

the probability distribution of adding random noise is follows:

$$P(D = d|M = m) = P(n) = \frac{1}{(2\pi)^{\frac{n}{2}}|\det C_n|^{\frac{1}{2}}}\exp\{-[d - G(m)]^T C_n^{-1}[d - G(m)]\}$$

where, $C_n$ is the noise covariance matrix, $C_n^{-1}$ is the inversion operation of a noise covariance matrix, and det is the determinant of the corresponding matrix;

n is noise and obeys Gaussian distribution, the average value is 0, $C_n$ is an equivalent diagonal matrix, and diagonal elements are the variance $\sigma_n^2$ containing noise of data center, then the probability distribution of adding the random noise is deformed as follows:

$$P(D = d|M = m) = \prod \frac{1}{(2\pi)^{\frac{n}{2}}\sigma_n}\exp\{-\sigma_n^2\sum[d - G(m)]^2\}$$

for the prior probability distribution P(M=m) of the inversion depth domain model parameter, setting the initial model $m^0$, there is $m=m^0+\Delta m$, and the equivalent depth domain model probability distribution is: $P(M=m)=P(m=m^0+\Delta m)=P(\Delta m=M-m^0)$;

letting the probability distribution of the equivalent depth domain model obey Gaussian distribution, and the probability distribution of the depth domain model with the random noise added is:

$$P(M - m) = \frac{1}{(2\pi)^{\frac{n}{2}}|\det C_{\Delta m}|^{1/2}}\exp\{-[m - m^0]^T C_{\Delta m}^{-1}[m - m^0]\}$$

assuming that the average value of the depth domain model parameters is equal to the initial model $m^0$, and they do not affect each other, there is a simplified probability distribution of the depth domain model, which is as follows:

$$P(M-m) = \frac{1}{(2\pi)^{\frac{n}{2}}\sigma_m} \exp\{-\sigma_m^2[m-m^0]\}$$

where, $\sigma_m$ represents the variance value of the real model relative to the given initial model;

a denominator $P(D=d)$ in the probability distribution deformation added with the random noise added depends on data acquisition and processing, and is set as a constant, and maximizing posterior probability is equivalent to maximizing a numerator, which maximizes posterior probability distribution:

$$P(M=m|D=d) = \prod \frac{1}{(2\pi)^n \sigma_n \sigma_m} \exp\{-\sigma_n^{-2}\sum[d-G(m)]^2 - \sigma_m^2\sum[m-m^0]^2\},$$

making the maximum equivalent formula of posterior probability distribution as:

$$F(m) = \sigma_n^{-2}[d-G(m)]^2 + \sigma_m^{-2}\Sigma[m-m^0]^2 \to 0$$

letting the partial derivative of the model parameter m equal to zero, and $G(m)=G(m^0)+A\Delta m$, $\Delta m=m-m^0$, thereby obtaining the matrix equation:

$$\frac{\partial F(m)}{\partial m} = \sigma_n^{-2}[d-G(m^0)-A\Delta m]IA - \sigma_m^2 I\Delta m = 0$$

$$dI\sigma_n^{-2}A - \sigma_m^2 I\Delta m - G(m^0)\sigma_n^{-2}IA - A\Delta mI\sigma_n^{-2}A = 0$$

where, $$A_{ij} = \frac{\partial G_i}{\partial m_j},$$

I is an identity matrix, $\Delta m$ is a wave impedance iterative matrix, arranging to obtain the basic formula of random inversion as follows:

$$[d-G[m^0]]A = [AA^T + \sigma_n^2\sigma_m^{-2}I]\Delta m$$

$$\Delta m = [AA^T + \sigma_n^2\sigma_m^{-2}I]^{-1}A^T[d-G(m^0)]$$

the iterative formula of the basic formula of random inversion is: $m^{k+1} = m^k + \Delta m$;

where, $G[m^0]$ is the depth domain synthetic seismic record formed by the parametric model, and d is observation data;

updating the parameters of the unknown underground wave impedance model through continuous iteration until positive and negative shocks occur in $\Delta m$, where, m is low frequency wave impedance inversion data;

based on the correlation between the plane coordinates of the virtual well site and the plane coordinates of the seismic data, further determining the one-to-one correspondence between the virtual well and the low-frequency wave impedance inversion data, and then assigning the low frequency wave impedance inversion data beside the virtual well to the virtual well to obtain the wave impedance data of the virtual well site; and based on the wave impedance inversion data volume, extracting the wave impedance data of the virtual well site, setting the calculation area as the whole range of the work area in the geological framework according to the interpolation calculation of all virtual well wave impedance data in the time window range defined by the stratigraphic framework to obtain the stable stratigraphic wave impedance data.

Another aspect of the present invention provides a system for optimally selecting a carbon storage site based on multi-frequency band seismic data, which comprises:

a data obtaining module configured for obtaining the original seismic data and well logging data of a known well site, then obtaining near-well geological interpretation results and three-dimensional post-stack seismic data, and obtaining the depth data of a maker layer of a target horizon and the isochronous three-dimensional distribution of the marker layer based on the three-dimensional post-stack seismic data;

a pretreatment module configured for eliminating the abnormal values and performing standardized pretreatment to obtain standardized well logging data based on the well logging data;

a spread spectrum simulation module configured for performing seismic wavelet spread spectrum simulation to obtain spread spectrum simulated wavelets based on the three-dimensional post-stack seismic data;

an isochronous stratigraphic framework model obtaining module configured for building an isochronous stratigraphic framework model of a target horizon, and calculating the geometric structure and spatial distribution of the fault-karst based on the spread spectrum simulated wavelets;

a Bimf component obtaining module configured for performing multi-scale decomposition to obtain multi-scale Bimf components of the seismic data based on the three-dimensional post-stack seismic data and the spread spectrum simulated wavelets;

a time-depth conversion relationship obtaining module configured for performing well-to-seismic calibration and ignoring small-scale Bimf components in the multi-scale Bimf components of the seismic data to obtain the time-depth conversion relationship based on the spread spectrum simulated wavelets and standardized well logging data;

a wave impedance inversion data volume obtaining module configured for performing waveform-indicated seismic wave impedance inversion to obtain a wave impedance inversion data volume based on the well logging data, the frequency-boosted seismic data and the time-depth conversion relationship, and on the basis of stratigraphic trend information provided by the isochronous stratigraphic framework model;

a stable stratum wave impedance data volume obtaining module configured for based on the three-dimensional post-stack seismic data, calculating a three-dimensional variance attribute volume, delineating the a sedimentary stable area, selecting the virtual-well site based on the sedimentary stable area, and obtaining the stable stratum wave impedance data volume through the virtual well cross-well wave impedance interpolation;

an abnormal wave impedance data volume obtaining module configured for calculating the difference between the stable stratum wave impedance data volume and the wave impedance inversion data volume to obtain the abnormal wave impedance data volume;

a fault-karst wave impedance data volume obtaining module configured for retaining the abnormal wave impedance data in the spatial geometric contour of the fault-karst by removing areas lower than the average value in the three-dimensional variance attribute volume to obtain the fault-karst wave impedance data volume including the geometric structure and internal wave impedance characteristics of the fault-karst;

a model interpretation module configured for comparing the near-well geological interpretation result with the fault-karst wave impedance data volume, delineating the characteristic value interval of a cave reservoir, the characteristic value interval of a fractured zone and the characteristic value interval of a surrounding rock, and obtaining a fault-karst reservoir bed interpretation model; and according to a fault-karst reservoir bed interpretation model, the migration and reservoir space is calculated after carbon dioxide injection, and a trap structure with the preset size threshold value is found, so that the migration and reservoir space where the injected carbon dioxide is stored in a high-density free phase under the conditions of being blocked by the tight carbonate rocks at the side of the fault zone and sealed by a top marl cover coat is selected as the position of the carbon storage box.

A third aspect of the present invention provides electronic equipment, which comprises at least one processor, and a memory communicatively connected to the at least one processor, wherein the memory stores instructions that can be executed by the processor, and the instructions are used to be executed by the processor to realize the method for optionally selecting the carbon storage site based on multi-frequency band seismic data.

A fourth aspect of the present invention provides a computer-readable storage medium. The computer-readable storage medium stores computer instructions which are used to be executed by a computer to realize the above-mentioned method for optimally selecting the carbon storage site based on multi-frequency band seismic data.

The present invention has the following beneficial effects:

(1) on the one hand, the present invention improves an effective frequency band of seismic data through the interaction of multi-scale decomposition of Bimf seismic data and well-to-seismic calibration, and improves the ability of the seismic data to characterize the details of underground geological bodies;

(2) on the other hand, by analyzing the stable stratum wave impedance data volume and inversion results of wave impedance of the fault zone, the difference of wave impedance between the fault-karst and the surrounding rock is highlighted, and the detailed characteristics of the fault-karst structure are enhanced; and by analyzing the wave impedance and the fault in the sedimentary stable area, the accuracy of the fault-karst reservoir bed interpretation model is improved, and the problem that as the fault-karst developed near the fault zone is complex in distribution and has various geometric structure, it is difficult to accurately locate and identify the spatial geometric structure of the fault-karst reservoir bed to assist carbon dioxide storage is solved;

(3) in the later stage of carbon storage, it is not only necessary to consider the storage capacity of the reservoir space, that is, the quantitative identification of carbon storage box space, but also necessary to study the trap structure of the geological body, that is, whether the lithology and thickness of the cover coat have the closure property from the safety point of view. The present invention effectively identifies and locates the position of the carbon storage box according to the difference in wave impedance, depicts the geometrical characteristics and development environments of the carbon storage box, and contributes to the later evaluation of carbon storage reserves; and (4) because of the inhomogeneity inside the fault-karst, it is difficult to quantitatively evaluate the storage space of carbon dioxide. The fault-karst reservoir bed interpretation model obtained by the present invention not only has the geometric structure characteristics of the fault-karst, but also has abundant internal wave impedance structure information, which is of great significance for evaluating the effective carbon dioxide reservoir space inside the fault-karst. This conclusion is highly reliable as the basis for the selection of the carbon storage box site.

DETAILED DESCRIPTION OF THE EMBODIMENTS

Figure 1A:
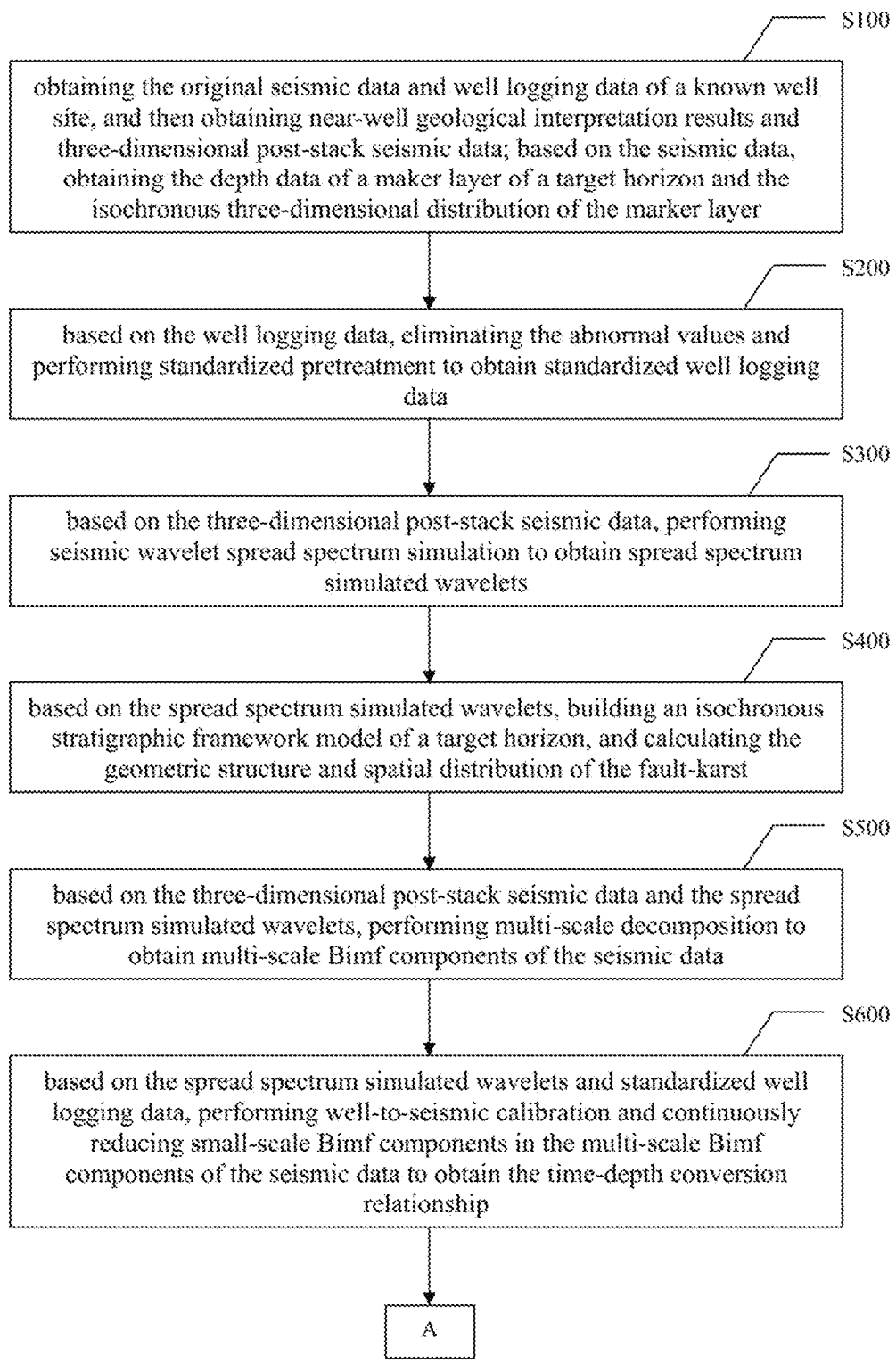
FIG. 1A and FIG. 1B is a flow schematic diagram of a method for optimally selecting a carbon storage site based on multi-frequency band seismic data according to an embodiment of the present invention.

The present invention provides a method for optimally selecting a carbon storage site based on multi-frequency band seismic data, which comprises:

obtaining original seismic data and well well logging data of a known well site, and then obtaining near-well geological interpretation results and three-dimensional post-stack seismic data; based on the three-dimensional post-stack seismic data, obtaining the depth data of a maker layer of a target horizon and the isochronous three-dimensional distribution of the marker layer;

based on the well logging data, eliminating abnormal values and performing standardized pretreatment to obtain standardized well logging data;

based on the three-dimensional post-stack seismic data, performing seismic wavelet spread spectrum simulation to obtain spread spectrum simulated wavelets;

based on the spread spectrum simulated wavelets, building an isochronous stratigraphic framework model of the target horizon, and calculating the geometric structure and spatial distribution of the fault-karst;

based on the three-dimensional post-stack seismic data and the spread spectrum simulated wavelets, performing multi-scale decomposition to obtain multi-scale Bimf components of the seismic data;

based on the spread spectrum simulated wavelets and the standardized well logging data, performing well-to-seismic calibration and ignoring small-scale Bimf components in the multi-scale Bimf components of the seismic data to obtain a time-depth conversion relationship;

based on the well logging data, the frequency-boosted seismic data and the time-depth conversion relationship, and on the basis of stratigraphic trend information provided by the isochronous stratigraphic framework model, performing waveform-indicated seismic wave impedance inversion to obtain a wave impedance inversion data volume;

based on the three-dimensional post-stack seismic data, calculating a three-dimensional variance attribute volume, delimiting a sedimentary stable area, selecting a virtual well site based on the sedimentary stable area, and obtaining a stable stratum wave impedance data volume through a virtual well cross-well wave impedance interpolation;

calculating the difference between the stable stratum wave impedance data volume and the wave impedance inversion data volume to obtain the abnormal wave impedance data volume, and highlighting the influence of the fault zone on the wave impedance of the stable sedimentary strata;

by removing areas lower than the average value in the three-dimensional variance attribute volume, retaining the abnormal wave impedance data in the spatial geometric contour of the fault-karst to obtain a fault-karst wave impedance data volume including the geometric structure and internal wave impedance characteristics of the fault-karst;

comparing the near-well geological interpretation result with the fault-karst wave impedance data volume, delineating a characteristic value interval of a cave reservoir, a characteristic value interval of a fractured zone and a characteristic value interval of surrounding rock, and obtaining a fault-karst reservoir bed interpretation model; and according to the fault-karst reservoir bed interpretation model, calculating migration and reservoir space after carbon dioxide injection, and finding a trap structure with a preset size threshold value, so that the migration and reservoir space where the injected carbon dioxide is stored in a high-density free phase under the conditions of being blocked by tight carbonate rocks at the side of the fault zone and sealed by a top marl cover coat is selected as the position of the carbon storage box.

The method for optimally selecting the carbon storage site based on multi-frequency band seismic data solves the problems by performing difference operation between a background stratum wave impedance model and the wave impedance inversion data volume that as the carbon storage boxes developed near the fault zones are complex in distribution and have various geometric structures, and it is difficult to accurately locate and identify the spatial geometric structures of the carbon storage boxes to assist carbon dioxide storage.

Figure 1B:
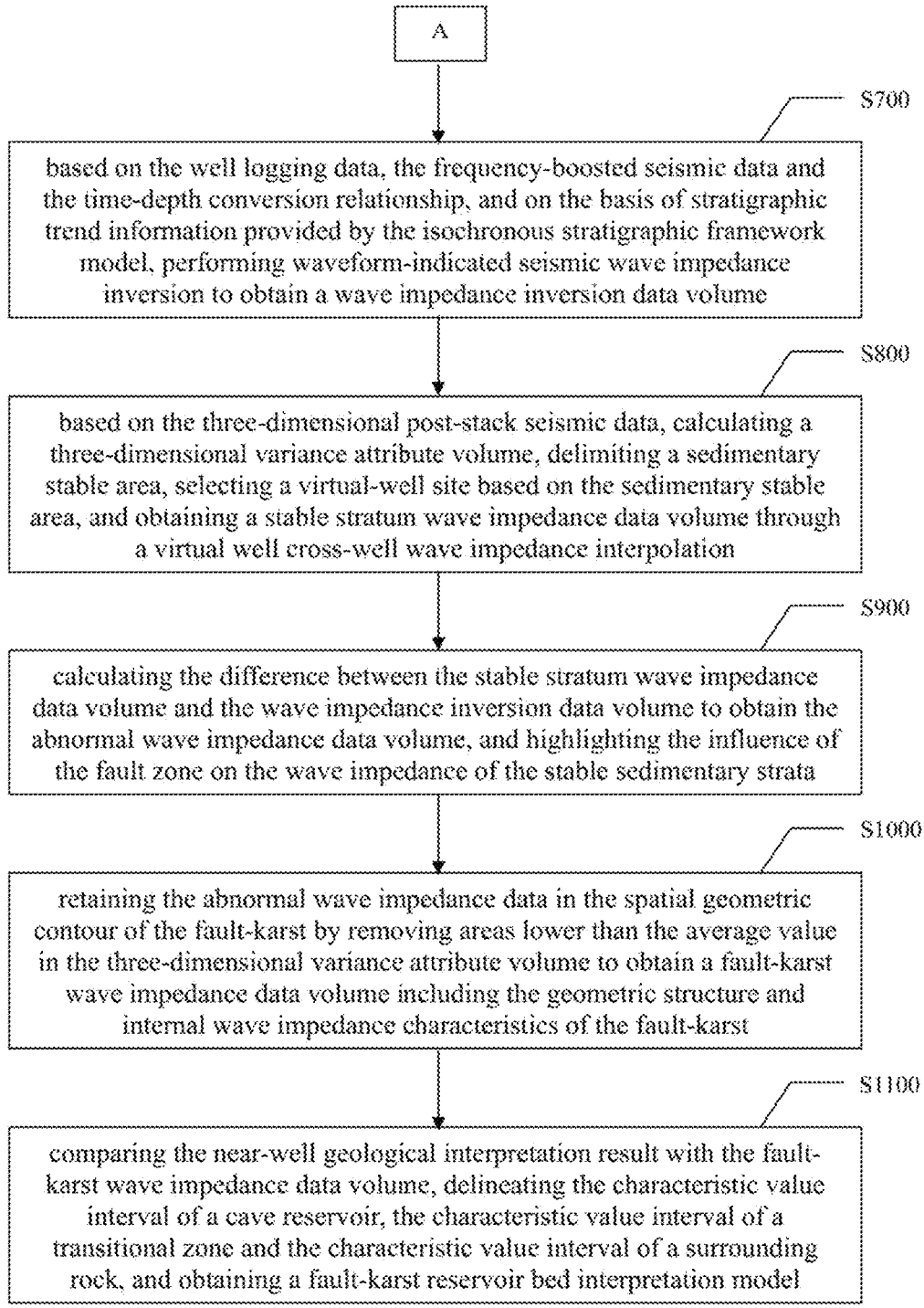

In order to more clearly explain the method for optimally selecting the carbon storage site based on multi-frequency band seismic data, the steps in the embodiment of the present invention will be described in detail below with reference to FIG. 1.

Figure 2:
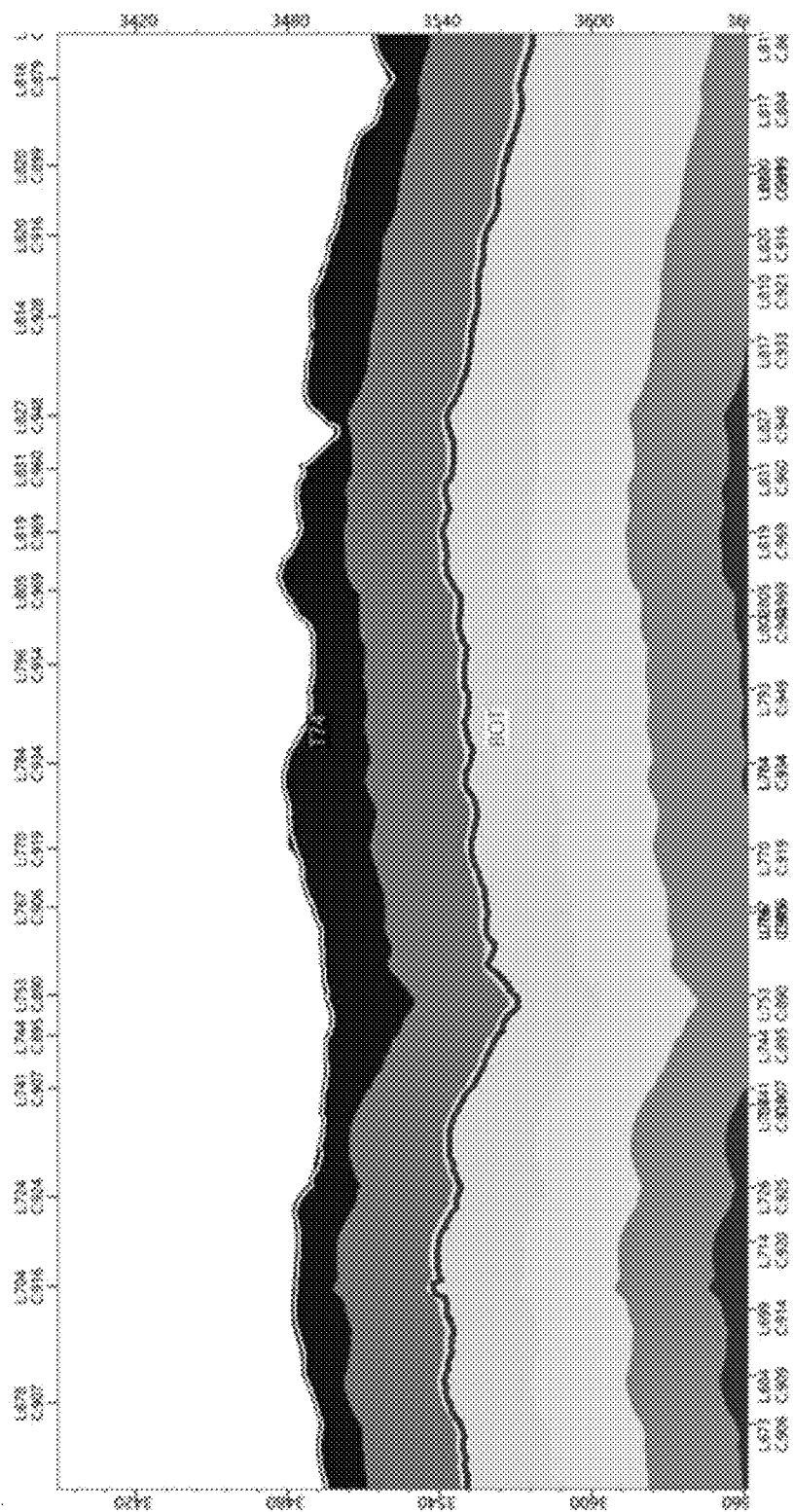
FIG. 2 is a schematic diagram of original seismic data according to an embodiment of the present invention.

Each step of the method for optimally selecting the carbon storage site based on multi-frequency band seismic data in the first embodiment of the present invention is described in detail as follows:

obtaining the original seismic data and well logging data of the known well site, and then obtaining the near-well geological interpretation results and the three-dimensional post-stack seismic data; based on the three-dimensional post-stack seismic data, obtaining the depth data of the maker layer of the target horizon and the isochronous three-dimensional distribution of the marker layer, wherein the original seismic data is as shown in FIG. 2;

determining a top boundary marker layer of the Yingshan Formation by observing seismic waveform data, compared with the mudstone layer of the overlying Bachu Formation, the waveform reflection in the inner part of the carbonate rock is irregular and has no certain direction, the amplitude can be strong or weak, and the event can be long or short and has poor continuity; and there are non-systematic event reflection termination and bifurcation phenomena. According to the major axis of the interface between them, the top surface of Yingshan Formation is determined as the marker layer.

The well logging data are nine conventional well logging curve data obtained by means of conventional well logging instruments within the detection depth range of 5500-5750 m at the wellbore of a work area; the well logging data comprises data of lithology characterization curves, data of well diameter curves, natural gamma curves, spontaneous potential curves and resistivity curves, data of deep lateral well logging curves, shallow lateral logging curves, micro lateral well logging curves, and physical property characterization curves, and data of compensated neutron curves, compensated acoustic wave curves and density curves. The sampling interval of the well logging curve data is 0.01 m. With the help of imaging well logging, well drilling, mud logging, cores, and other information, determinate lithology and physical property information of individual depth sections can be obtained, then various parameter threshold ranges of surrounding rocks, cave type reservoir beds, fracture type reservoir beds, and hole type reservoir beds are demarcated, and the near-well geological interpretation results can be obtained according to various parameter threshold ranges.

According to the present embodiment, the three-dimensional post-stack seismic data with a work area of about 27 km$^2$ is obtained by utilizing a three-dimensional seismic exploration method with the help of a seismic wave excitation source and a seismic signal detector, the double-way travel time of the signal record is 4 s, the time interval of the sampling point is 1 ms, and the detection depth exceeds 6000 m.

At present, a 25 m×25 m trace spacing three-dimensional seismic grid technology is widely used in the field of petroleum exploration. Generally, seismic wave reflection signals are received vertically at a sampling interval of 1 ms, and the total sampling time is within 6 s, so that the geological characteristics of different depth intervals are detected. The present embodiment is used for the detection of target bodies above 5 m, and has a high requirement for the main frequency of the seismic data, which should be within the range of 50-60 Hz. When the main frequency of the amplitude data volume of the seismic data in a fractured-cave body development interval is lower than 50 HZ, it is necessary to use a one-dimensional empirical mode decomposition algorithm based on seismic wavelet simulation to expand the frequency and reduce the noise of the seismic data for obtaining spread spectrum seismic data with a high resolution and a high signal-to-noise ratio.

Based on the well logging data, eliminating the abnormal values and performing standardized pretreatment to obtain the standardized well logging data;

the abnormal values are outliers, based on the obtained nine conventional well logging curve data, a statistical histogram is drawn for all wellbore data of each kind curves in the nine conventional logging curve data, the interval threshold is adjusted reasonably, the top 5% of data with the largest deviation from a median is removed, and data points in a box-selected interval, that is, the well logging data with abnormal values removed are retained.

In the standardization process, based on the well logging data with abnormal values removed, single kind of data of all known well sites in the work area with the abnormal values removed are superimposed to draw a curve histogram, and standardized well logging data is obtained by integrating thresholds.

The steps of abnormal value removal and standardization can eliminate the influence of the cross-well instruments.

Based on the three-dimensional post-stack seismic data, seismic wavelet spread spectrum simulation is performed to obtain the spread spectrum simulated wavelets; and seismic wavelet simulation is a data processing method that improves the resolution of seismic signals by widening the effective frequency band on the premise of ensuring the relatively high fidelity of the processed seismic data.

According to the present invention, a method of obtaining the spread spectrum simulated wavelets comprises:

expressing a seismic record convolution model of the original seismic data in a frequency domain as:

$$s(\omega)=6(\omega)\varepsilon(\omega)$$

where, $s(\omega)$ represents the seismic record frequency spectrum after Fourier transformation, $\sigma(\omega)$ represents the seismic wavelet frequency spectrum after Fourier transformation, $\varepsilon(\omega)$ represents the reflection coefficient frequency spectrum after Fourier transformation, and $\omega$ represents the angular frequency;

transforming the expression of the seismic record convolution model in the frequency domain into the expression in the frequency domain of a seismic record linear system:

$$\ln s(\omega)=\ln\sigma(\omega)+\ln\varepsilon(\omega)$$

where, $\ln s(\omega)$ is the expression in the frequency domain of the seismic record linear system, $\ln\sigma(\omega)$ is the expression in the frequency domain of a seismic wavelet linear system, and $\ln\varepsilon(\omega)$ is the expression in the frequency domain of a reflection coefficient linear system; Fourier transformation is:

$$\tilde{s}(t)=\tilde{\sigma}(t)+\tilde{\varepsilon}(t)$$

where, $\tilde{s}(t)$ represents a complex cepstrum sequence of a seismic record frequency spectrum, $\tilde{\sigma}(t)$ represents a complex cepstrum sequence of a seismic wavelet frequency spectrum, $\tilde{\varepsilon}(t)$ represents a complex cepstrum sequence of a reflection coefficient spectrum, and t represents the arrival time of seismic waves;

separating the wavelet complex cepstrum sequence from the reflection coefficient complex cepstrum sequence in a complex cepstrum by a low-pass filter to extract wavelet amplitude, wherein the wavelet amplitude is extracted by using the characteristic that the difference of smoothness between the wavelets and the reflection coefficient sequence is easy to distinguish in the complex cepstrum, the wavelet energy appears near the origin, while the reflection coefficient sequence is far from the origin;

based on the wavelet amplitude, simulating a seismic wavelet amplitude spectrum by the least square method:

$$\sigma(f)=A(f)f^{\alpha}e^{H(f)}$$

where, $\alpha$ represents a constant greater than or equal to 0, $\sigma(f)$ represents the seismic wavelet frequency spectrum, which is obtained from the Fourier transform of $\sigma(t)$, and $H(f)$ and $A(f)$ are polynomials about the frequency f to be solved, which are used to fit the seismic wavelet amplitude spectrum;

obtaining the maximum phase component and the minimum phase component of the wavelet based on the simulated seismic wavelet amplitude spectrum;

letting the maximum phase component of the wavelet $\sigma(t)$ be $u(t)$ and the minimum phase component be $\sigma(t)$, then the wavelet $v(t)$ is:

$$\sigma(t)=u(t)\cdot v(t)$$

the complex cepstrum of the amplitude spectrum is expressed as:

$$2\widetilde{\sigma_0}(t)=\tilde{u}(t)+\tilde{v}(t)+\tilde{u}(-t)+\tilde{v}(-t)$$

where, the complex cepstrum $\widetilde{\sigma_0}(t)$ of the amplitude spectrum is symmetrically displayed on positive and negative axes of the complex cepstrum, $\tilde{v}(-t)$ is the complex cepstrum of the minimum phase function corresponding to the maximum phase component $u(t)$ of the seismic wavelet, and $\tilde{v}(-t)$ is the complex cepstrum of the maximum phase function corresponding to the minimum phase component $u(t)$ of the seismic wavelet;

determining a set of mixed-phase wavelet sets with the same amplitude spectrum based on the complex cepstrum of the amplitude spectrum, adjusting Yu wavelet parameters, raising the main frequency by keeping the low frequency and expanding the high frequency on the premise of ensuring the integrity of the main frequency of the seismic wavelet, and raising the effective bandwidth to the preset bandwidth threshold to obtain the spread spectrum simulated wavelets. Usually, the effective bandwidth is set to 0-60 Hz.

Figure 3:
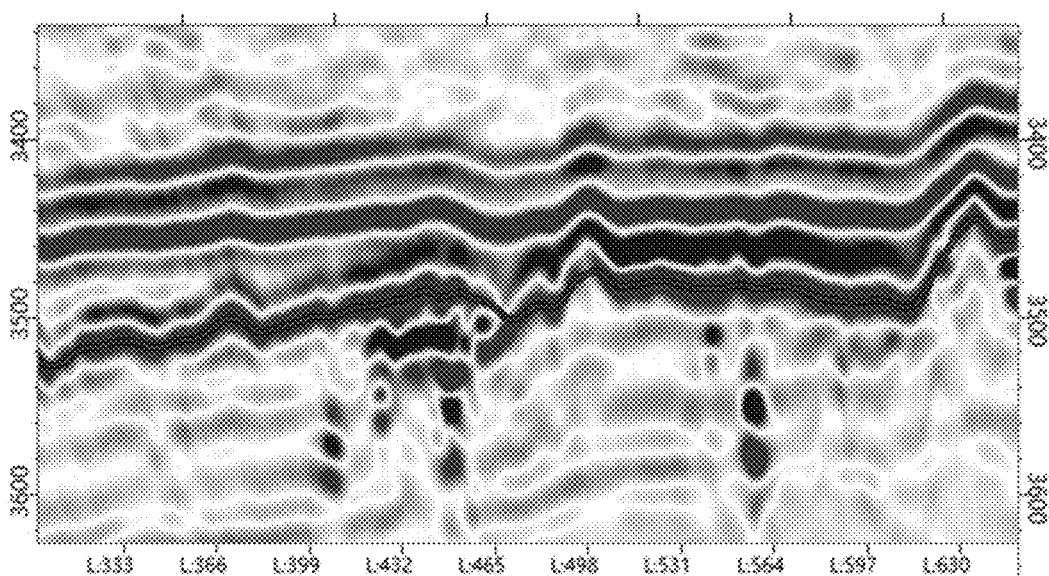
FIG. 3 is a schematic diagram of an isochronous stratigraphic framework model according to an embodiment of the present invention.
Figure 4:
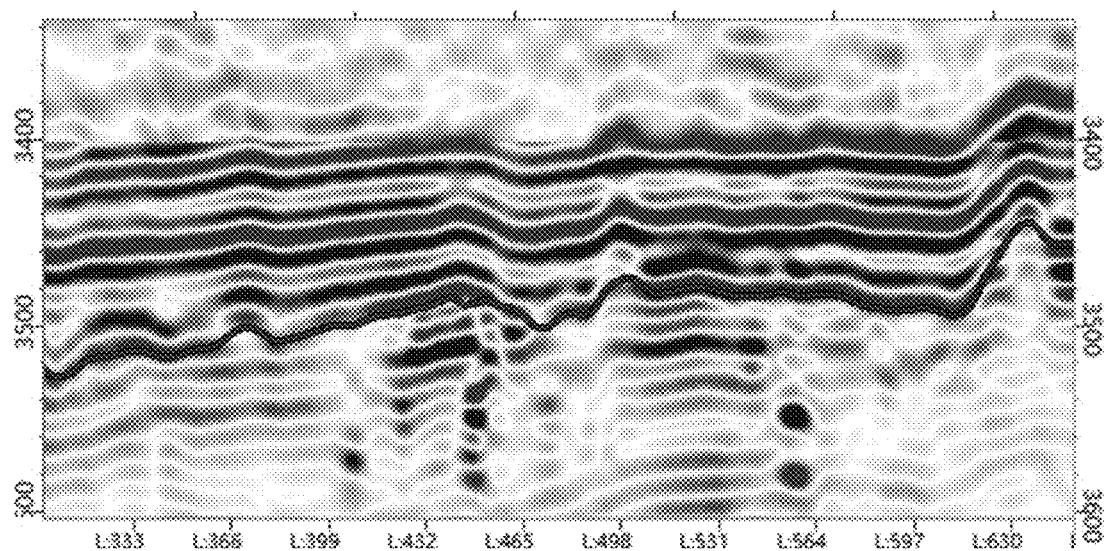
FIG. 4 is a schematic diagram of multi-scale Bimf components of seismic data when r is set to 0.2 according to an embodiment of the present invention.

Based on the spread spectrum simulated wavelets, building the isochronous stratigraphic framework model of the target horizon, and calculating the geometric structure and spatial distribution of the carbon storage box, wherein the isochronous stratigraphic framework model is as shown in FIG. 3;

based on the three-dimensional post-stack seismic data and the spread spectrum simulated wavelets, performing multi-scale decomposition to obtain multi-scale Bimf components of the seismic data; according to the present embodiment, the multi-scale decomposition of the seismic signal is realized by the step-by-step screening of the spread spectrum simulated wavelets, characteristic signals of different scales can be quickly extracted, noise are separated from useful signals, and the extraction of the internal trend information of the seismic signal is realized. Further, the ability of the seismic data to represent the details of the underground geological body is improved. The purpose of the present invention is to obtain a high-resolution result; high-resolution means that the seismic data with the high-frequency band is needed, but now the distribution range of the effective frequency band is 20-35 Hz, and there is a lot of noise in the high-frequency band, which affects the observation of the fault-karst; and by ignoring the small-scale Bimf components, the influence of noise in high resolution can be avoided, and the accuracy rate is improved. In the present invention, a method of obtaining the Bimf components of the seismic data comprises:

slicing the three-dimensional post-stack seismic data along the direction of "gather" to obtain several pre-stack gather matrices; $U(x, y)$, $x=1, \ldots, M$; $y=1, \ldots, N$;

obtaining Bimf components by empirical mode decomposition;

setting an initial pre-stack gather matrix:

$$r_0(x,y)=U(x,y),$$

where, x is the matrix row coordinate, y is the matrix column coordinate, U is the value of the post-stack three-dimensional seismic data, and $r_0$ is the matrix element value;

setting a variable l as the number of decomposed Bimf layers, and the initial value of l to 1, defining an initialization matrix variable as h, and obtaining a variable matrix $h(x, y)$ as follows:

$$h(x,y)=r_{l-1}(x,y);$$

calculating the local maximum matrix and local minimum matrix about $h(x, y)$;

observing with an observation matrix of a preset size in the variable matrix $h(x, y)$, extracting the element value in the observation matrix, and obtaining the maximum value of the observation matrix, wherein the small matrix with the preset size of 4×4 can be used for observation;

sliding the observation matrix until the center of the observation matrix traverses all matrix variables h, and assigning the measured maximum value of the observation matrix to the central element position of the corresponding observation matrix to obtain a local maximum matrix $Max(x, y)$;

obtaining the minimum value in the observation matrix by setting the observation matrix, and then obtaining a local minimum matrix $Min(x, y)$;

obtaining the maximum envelope surface and the minimum envelope surface by a spline interpolation method;

the interpolation formula is:

$$N(i+m,j+n)=ABC$$

where, A, B, and C represent an interpolation transition matrix:

$$A = [\delta(1+m) \quad \delta(m) \quad \delta(1-m) \quad \delta(2-m)]$$

$$B = \begin{bmatrix} Max(i-1, j-2) & Max(i, j-2) & Max(i+1, j-2) & Max(i+2, j-2) \\ Max(i-1, j-1) & Max(i, j-1) & Max(i+1, j-1) & Max(i+2, j-1) \\ Max(i-1, j) & Max(i, j) & Max(i+1, j) & Max(i+2, j) \\ Max(i-1, j+1) & Max(i, j+1) & Max(i+1, j+1) & Max(i+2, j+1) \end{bmatrix}$$

$$C = [\delta(1+n) \quad \delta(n) \quad \delta(1-n) \quad \delta(2-n)],$$

where, u and v are preset values greater than 0 and less than 1, and δ is the spread spectrum simulated wavelet;

obtaining $N_{Max}$ as the maximum envelope surface, replacing the local maximum matrix $Max(x, y)$ in a transition formula B with the local minimum matrix $Min(x, y)$, and obtaining $Min(x, y)$ as the minimum envelope surface;

calculating the average value of the maximum envelope surface and the minimum envelope surface to obtain the intermediate transition quantity;

$$m_{l-1}(x,y)=[N_{Max}(x,y)+Min(x,y)]/2;$$

subtracting the intermediate transition quantity from the variable matrix $h(x, y)$ to obtain the Bimf components of the J-th layer corresponding to the seismic data:

$$Bimf_l(x,y)=h(x,y)-m_{l-1}(x,y);$$

obtaining the margin $r_{l-1}$ as an input variable for calculating the Bimf components of the next layer;

$$r_l(x,y)=r_{l-1}(x,y)-Bimf_l(x,y);$$

where, $r_l$ represents the margin of the l-th layer, l−1 represents the margin of the l−1-th layer, and the margin of the l−1-th layer serves as an input variable of the Bimf component of the l-th layer;

calculating the Bimf components iteratively until the termination condition is met:

$$\sum_{x=1}^{M} \sum_{y=1}^{N} \left[ \frac{|Bimf_l(x, y) - Bimf_{l-1}(x, y)|^2}{Bimf_{l-1}^2(x, y)} \right] \leq r;$$

and obtaining the multi-scale Bimf components of the seismic data, where, r is the preset termination threshold; usually, the value of r is 0.2-0.3; the present embodiment takes 0.2 as an example, as shown in F 4, which can ensure the number and quality of Bimf and ensures that the bimf better reflects the details of waveform.

The small-scale Bimf components contain a large amount of noise and detail information and edge information of the signal, while medium and large-scale Bimf components characterize the internal structural characteristics and trend characteristics of the signal.

By ignoring the small-scale Bimf components of the seismic data, it is found that the correlation coefficients of synthetic seismic records and near-well earthquakes first increase and then decrease, and the corresponding reduced seismic data with the highest correlation coefficient is selected for subsequent calculation.

After wavelet spread spectrum simulation, the effective frequency band of the seismic data is expanded, and the high frequency part is reasonably strengthened. The number of the events increases on the seismic waveform, which makes it easier to reflect the detailed changes of seismic reflection information, and improves the consistency of waveforms of the same reflection wave group in terms of amplitude, phase and frequency. The "beaded" reflection feature is particularly obvious on the seismic response of fractured-cave bodies, and the details of the internal shape of beads can be clearly displayed, which represents the seismic reflection of complex fractured-cave reservoir beds with different structural features and fillings, and is helpful for later fine geological interpretation.

based on the spread spectrum simulated wavelets and the standardized well logging data, performing well-to-seismic calibration and ignoring small-scale Bimf components in the multi-scale Bimf components of the seismic data to obtain the time-depth conversion relationship; and based on the well logging data, the frequency-boosted seismic data and the time-depth conversion relationship, and on the basis of stratigraphic trend information provided by the isochronous stratigraphic framework model, performing waveform-indicated seismic wave impedance inversion to obtain a wave impedance inversion data volume.

According to the present embodiment, a method of obtaining the time-depth conversion relationship comprises:

performing product operation based on a sonic time difference curve and a density curve in the well logging data of each known well site to obtain a wave impedance curve, and further calculating a reflection coefficient curve;

constructing a Ricker wavelet on the basis of the main seismic frequency of a target interval, preferably using the Ricker wavelet of 25 Hz, and performing convolution calculation of the Ricker wavelet and the reflection coefficient curve to obtain the synthetic seismic record;

making the depth data of the maker layer at the wellbore of each drilling well position correspond to the isochronous three-dimensional distribution of the maker layer, calculating the correlation between the synthetic seismic record and the spread spectrum simulated wavelets of a seismic trace near the well, when the waveform correlation is higher than the first correlation threshold, the first correlation threshold is preferably greater than 85%, and the preliminary well-to-seismic calibration is completed to obtain the preliminary time-depth conversion relationship between the well logging depth and the two-way travel time of seismic reflection waves;

$$T_d = T_{H_0} + 2\Sigma_{i=1}^n T_i \Delta H,$$

where, $T_{H_0}$ represents the two-way travel time of the seismic data corresponding to the depth of the sonic well logging marker layer, T, represents the sonic time difference, $\Delta H$ represents the well logging curve data sampling interval; $T_d$ represents the two-way travel time of the seismic wave;

adding the Bimf components of the seismic data step by step in descending order of scale to obtain updated effective seismic data;

adding a Bimf component every time to obtain the updated effective seismic data, and calculating the second correlation between the synthetic seismic record after one time updating and the effective seismic data;

As the Bimf components are gradually added to the effective seismic data, the second correlation shows an upward trend at first, and when the second correlation shows a downward trend, the updated synthetic seismic record at the peak of the second correlation and the updated earthquake are taken to calculate the second time-depth conversion relationship; and taking the second time-depth conversion relationship as the finally measured time-depth conversion relationship.

Figure 5:
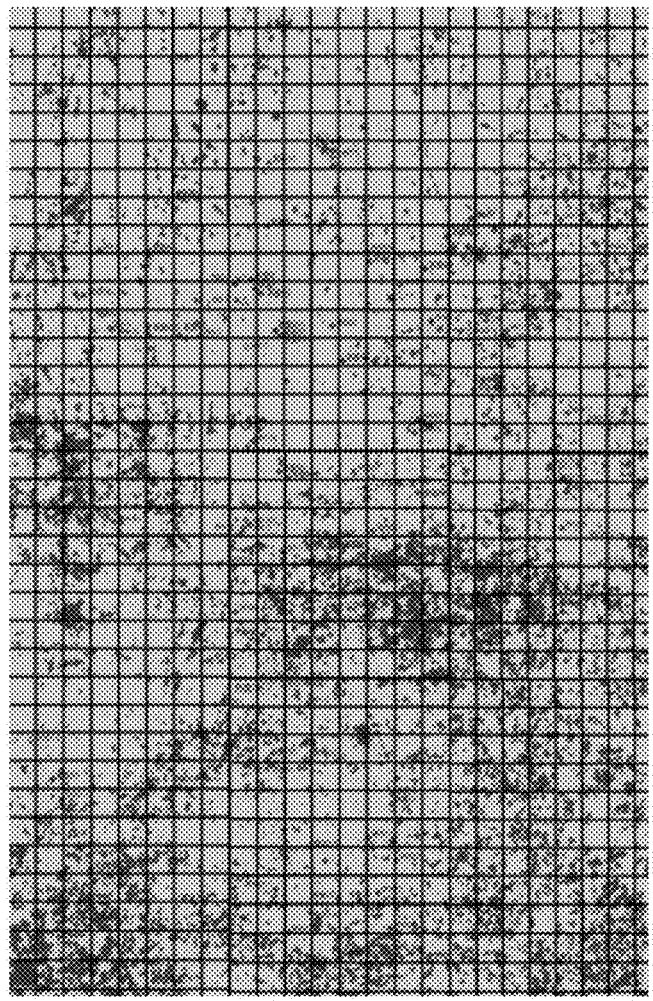
FIG. 5 is a schematic diagram of a virtual well site grid according to an embodiment of the present invention.

According to the present embodiment, a method of obtaining a wave impedance inversion data volume comprises:

based on the spread spectrum simulated wavelets, calculating the waveform correlation between the waveform of the seismic trace to be discriminated and the synthetic seismic record of the known well, and establishing an initial model according to the wave impedance curve corresponding to the well with the highest waveform correlation;

using white noise to satisfy the law of Gaussian distribution, and expressing the wave impedance data in well logging data as:

$$Y_{sim} = X_{sim} + \xi,$$

where, $Y_{sim}$ represents the well logging wave impedance curve, $X_{sim}$ represents the actual wave impedance value of the underground stratum to be solved, and $\xi$ represents random noise;

according to the central limit theorem, $\|X_{sim} - X_p\|^2$ also satisfies Gaussian distribution, determining the initial objective function as:

$$J_1 = \frac{\|x_{sim} - x_p\|^2}{2\sigma^2},$$

where $J_1$ represents the function related to posterior information, $X_p$ represents the selection of a wave impedance curve of a sample well to a sample well based on the optimal number of samples, after matched filtering, posterior probability statistical distribution density is obtained, then the expected wave impedance value is calculated, and $\sigma$ represents the covariance of white noise;

based on the initial objective function, introducing prior information into the objective function through maximum posterior estimation to obtain a stable objective function as follows:

$$J(Z_{sim}) = J_1(Z_{sim}) + \lambda^2 J_2(Z_{sim}),$$

where, $Z_{sim}$ represents the characteristic parameter to be simulated, $J_2$ represents the function related to the prior information of geological and well logging data, and $\lambda$ represents the smoothing parameter used to coordinate the interaction between $J_1$ and $J_2$;

taking the stable objective function as the input of the initial model, sampling the posterior probability distribution by a Markov chain Monte Carlo method (MCMC) and Metropolis-Hastings sampling criterion, continuously optimizing the parameters of the initial model, selecting the solution when the objective function takes the maximum value as a value randomly realized, taking the average value randomly realized many times as the expected value output, and taking the expected value output as the wave impedance inversion data volume.

based on the three-dimensional post-stack seismic data, calculating a three-dimensional variance attribute volume, delineating a sedimentary stable area, selecting a virtual well site based on the sedimentary stable area, and obtaining a stable stratum wave impedance data volume through a virtual well cross-well wave impedance interpolation; and the virtual well site division is shown in FIG. 5;

According to the present embodiment, a method of delineating the sedimentary stable area specifically comprises:

letting the data of each sampling point in the three-dimensional post-stack seismic data be $S_{ijk}$, where p represents the seismic gird wire size, q represents the seismic grid trace number, and k represents the sampling point serial number of seismic records sampled at 1 ms;

calculating the mean square error of sampling point data in a preset sampling area:

$$Q_{pqk} = \Sigma_{p-1}^{p+1} \Sigma_{k-1}^{k+1} (S_{pqk} - \tfrac{1}{9}\Sigma_{p-1}^{p+1}\Sigma_{q-1}^{q+1} S_{pqk})^2,$$

translating the sampling areas vertically and horizontally, transversely calculating the data mean square errors of all the sampling areas to obtain a three-dimensional variance attribute volume;

slicing the three-dimensional variance attribute volume, obtaining the distribution characteristics of variance attribute data on the plane, and taking the area where the variance attribute value is lower than the total energy average value as the sedimentary stable area.

According to the present invention, a method of obtaining the stable stratum wave impedance data volume specifically comprises:

delineating grids with preset sizes based on the sedimentary stable area, and taking each grid node as a virtual well site; according to the present embodiment, establishing 50×50 m grids for the structural working drawing of the sedimentary stable area, and taking each grid node as the virtual well site.

Letting the unknown underground wave impedance model parameter m be the g-dimensional space vector $m = \{m_1, \ldots, m_g\}$;

through an earthquake acquisition process, obtaining the observation data D as a K-dimensional data vector $d = \{d_1, \ldots, d_k\}$;

through a nonlinear function kernel G, establishing an unknown underground wave impedance model parameter, and establishing the relationship between the parameter and the K-dimensional data vector to obtain a forward model:

$$d = G(m) + n,$$

where, $n = \{n_1, \ldots, n_r\}$ represents random noise independent of the underground wave impedance model parameter m, which obeys Gaussian distribution; constructing the inversion objective function based on the forward model:

$$\min F[d, G(m)] = \min \|d, G(m)\|_2^2,$$

where, F is the mean square error between the observation data d and the predicted data G(m);

there is a serious nonlinearity between the observation data d and the model parameter M to be inverted, so it is necessary to perform linearized solution on the inversion objective function, and the accuracy of the solution depends on the reliability of prior information.

performing linearized solution on the inversion objective function;

performing Taylor expansion on the forward model and omitting higher-order terms of more than quadratic to obtain a brief expression of prediction data:

$$\Delta G(m) = G(m) - G(m^0) = A\Delta m = A(m - m^0),$$

where, $m^0$ represents the initial model established according to prior information, A is a Jacobian matrix, and the element of A is first-order partial differential $\partial G_i/\partial m_j$;

letting $d_0 = G(m_0) + \tau$, $\Delta d = d - d_0$, then the iterative equation of the forward model is:

$$m^{t+1} = m^t + \Delta m$$

where, $m^k$ represents the forward model after iteration t times, $m^{k+1}$ represents the forward model after iteration k+1 times, and $d_0$ is the noise-adding predicted data;

obviously, the linearized inversion method can obtain accurate results only when the initial model is relatively close to the real model, and from the point of mathematical calculation, the linear equation system tends to be ill-conditioned and has poor stability. When the prior information is insufficient, quantitative constraints can be performed on the model parameter to be inverted to control the size of the solution space so as to obtain stable and accurate inversion results; and this is the basic idea of a broadband constrained inversion method, and its essence is to obtain the optimal solution by using maximum likelihood distribution.

obtaining a pre-stack depth and an offset seismic profile d through a seismic acquisition process, assuming that the inversion depth domain model parameters have prior probability distribution P(M=m), according to Bayesian formula, the probability distribution is:

$$P(M = m|D = d) = \frac{P(D = d|M = m)P(M = m)}{P(D = d)},$$

From the perspective of probability theory, the purpose of inversion is to obtain the maximum posterior probability density P(M=m|D=d), from the perspective of geophysics, when the depth migration is known, there are many depth domain model parameters that can form the depth domain migration profile through the forward modeling process, the solution space is very large, and the purpose of inversion is to find the solution closest to the real earth model;

the probability distribution of adding random noise is follows:

$$P(D = d|M = m) = P(n) = \frac{1}{(2\pi)^{\frac{n}{2}}|\det C_n|^{\frac{1}{2}}} \exp\{-[d - G(m)]^T C_n^{-1}[d - G(m)]\},$$

where, $C_n$ is the noise covariance matrix, $C_n^{-1}$ is the inversion operation of a noise covariance matrix, and det is the determinant of the corresponding matrix;

n is noise and obeys Gaussian distribution, the average value is 0, $C_n$ is an equivalent diagonal matrix, and diagonal elements are the variance a containing noise of data center, then the probability distribution of adding the random noise is deformed as follows:

$$P(D = d|M = m) = \prod \frac{1}{(2\pi)^{\frac{n}{2}}\sigma_n} \exp\{-\sigma_n^2 \sum [d - G(m)]^2\},$$

For the prior probability distribution P(M=m) of the inversion depth domain model parameter, setting the initial model $m^0$, there is $m=m^0+\Delta m$, and the equivalent depth domain model probability distribution is: $P(M=m)=P(m=m^0+\Delta m)=P(\Delta m=m-m^0)$;

letting the probability distribution of the equivalent depth domain model obey Gaussian distribution, and the probability distribution of the depth domain model with the random noise added is:

$$P(M-m) = \frac{1}{(2\pi)^{\frac{n}{2}}|\det C_{\Delta m}|^{1/2}} \exp\{-[m-m^0]^T C_{\Delta m}^{-1}[m-m^0]\},$$

assuming that the average value of the depth domain model parameters is equal to the initial model $m^0$, and they do not affect each other, there is simplified probability distribution of the depth domain model, which is as follows:

$$P(M-m) = \frac{1}{(2\pi)^{\frac{n}{2}}\sigma_m} \exp\{-\sigma_m^2[m-m^0]\},$$

where, $\sigma_m$ represents the variance value of the real model relative to the given initial model;

a denominator $P(D=d)$ in the probability distribution deformation with the random noise added depends on data acquisition and processing, and is set as a constant, and maximizing posterior probability is equivalent to maximizing a numerator, which maximizes posterior probability distribution:

$$P(M=m|D=d) =$$
$$\prod \frac{1}{(2\pi)^n \sigma_n \sigma_m} \exp\{-\sigma_n^{-2}\sum[d-G(m)]^2 - \sigma_m^2\sum[m-m^0]^2\},$$

making the maximum equivalent formula of posterior probability distribution as:

$$F(m)=\sigma_n^{-2}\Sigma[d-G(m)]^2+\sigma_m^2\Sigma[m-m^0]^2 \to 0,$$

letting the partial derivative of the model parameter m equal to zero, and $G(m)=G(m^0)+A\Delta m$, $\Delta m=m-m^0$, thereby obtaining the matrix equation:

$$\frac{\partial F(m)}{\partial m} = \sigma_n^{-2}[d-G(m^0)-A\Delta m]IA - \sigma_m^2 I\Delta m = 0,$$

$$dI\sigma_n^{-2}A - \sigma_m^2 I\Delta m - G(m^0)\sigma_n^{-2}IA - A\Delta m I\sigma_n^{-2}A = 0,$$

where, $$A_{ij} = \frac{\partial G_i}{\partial m_j},$$

Figure 6:
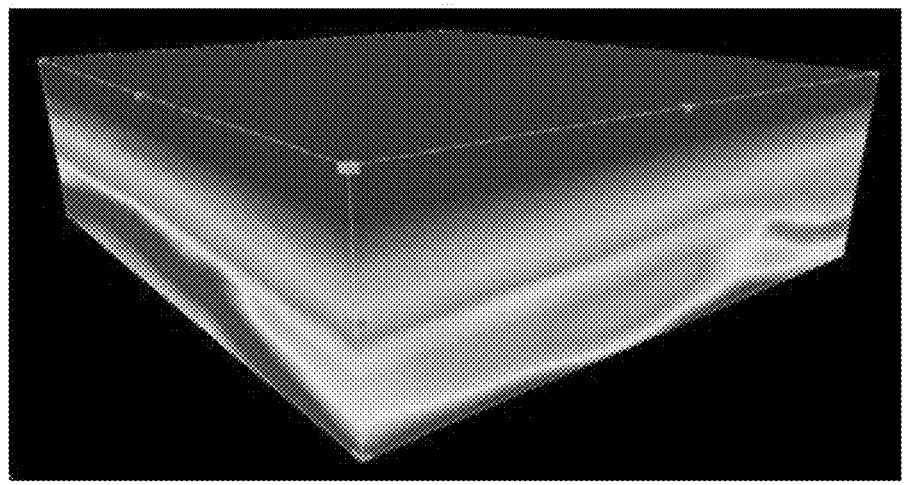
FIG. 6 is an effect schematic diagram of a stable stratum wave impedance data volume according to an embodiment of the present invention.
Figure 7:
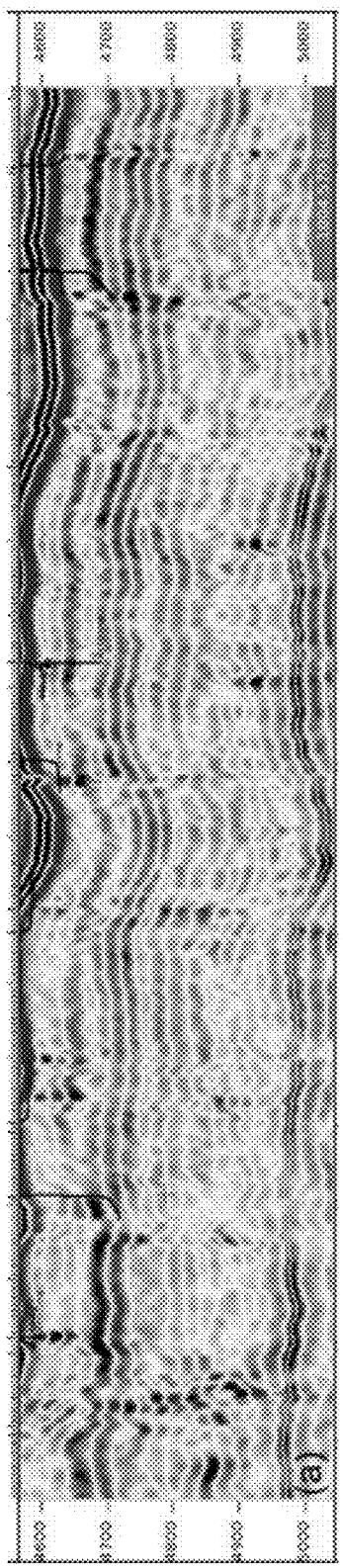
FIG. 7 is an effect schematic diagram of an abnormal wave impedance data volume according to an embodiment of the present invention.

I is an identity matrix, $\Delta m$ is a wave impedance iterative matrix, arranging to obtain the basic formula of random inversion as follows:

$$[d-G[m^0]]A=[AA^T+\sigma_n^2\sigma_m^{-2}I]\Delta m$$

$$\Delta m=[AA^T+\sigma_n^2\sigma m^2 I]^{-1}A^T[d-G(m^0)];$$

the iterative formula of the basic formula of random inversion is: $m^{k+1}=m^k+\Delta m$;

where, $G[m^\circ]$ is the depth domain synthetic seismic record formed by the parametric model, and d is observation data;

updating the parameters of the unknown underground wave impedance model through continuous iteration until positive and negative shocks occur in $\Delta m$, where, m is low frequency wave impedance inversion data;

based on the correlation between the plane coordinates of the virtual well site and the plane coordinates of the seismic data, further determining the one-to-one correspondence between the virtual well and the low-frequency wave impedance inversion data, and then assigning the low frequency wave impedance inversion data beside the virtual well to the virtual well to obtain the wave impedance data of the virtual well site;

based on the wave impedance inversion data volume, extracting the wave impedance data of the virtual well site, setting the calculation area as the whole range of the work area in the geological framework according to the interpolation calculation of all virtual well wave impedance data in the time window range defined by the stratigraphic framework to obtain the stable stratigraphic wave impedance data, and the effect of the stable stratum wave impedance data is as shown in FIG. 6;

calculating the difference between the stable stratum wave impedance data volume and the wave impedance inversion data volume to obtain the abnormal wave impedance data volume, and the effect of the abnormal wave impedance data volume is shown in FIG. 7;

by removing areas lower than the average value in the three-dimensional variance attribute volume, retaining the abnormal wave impedance data in the spatial geometric contour of the fault-karst to obtain the fault-karst wave impedance data volume including the geometric structure and internal wave impedance characteristics of the fault-karst;

comparing the near-well geological interpretation result with the fault-karst wave impedance data volume, delineating the characteristic value interval of a cave reservoir bed, the characteristic value interval of the crack fractured zone, and the characteristic value interval of the surrounding rock, and obtaining the fault-karst reservoir bed interpretation model; and according to the fault-karst bed interpretation model, evaluating the lithology and thickness of the caprock and selecting the position of the carbon storage box.

Well logging interpretation results, such as lithologic interpretation in the depth section where drilling is blocked, including fracture reservoir beds, cave reservoir beds, transition zones, and surrounding rocks are input; and according to the time-depth conversion relationship among the well site, the well logging data and the seismic data, the drilling trajectory and the well logging interpretation results are projected on the profile of the fault-karst wave impedance data.

Figure 8:
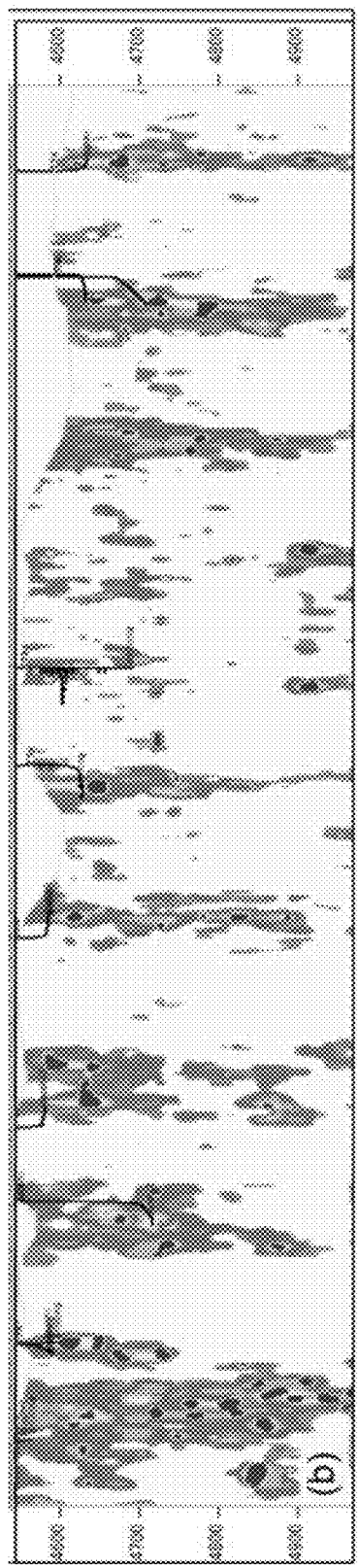
FIG. 8 is a schematic diagram of the site selection result of carbon dioxide storage and the internal geometric structure of a storage box according to an embodiment of the present invention.

The well logging interpretation results are compared with the eigenvalue energy data of a structure-eigenvalue model of the fault-karst, an area with the eigenvalue greater than 0.82 is defined as a crack reservoir bed, an area with the eigenvalue between 0.63 and 0.82 is defined as the cave reservoir bed, an area with the eigenvalue between 0.31 and 0.63 is defined as a transition zone, and an area with the eigenvalue less than 0.31 is defined as the surrounding rock, which is used as the final fault-karst reservoir bed interpretation model; and according to the fault-karst reservoir bed interpretation model, evaluating the lithology and thickness of the caprock and selecting the position of the carbon storage box. The site selection result of carbon dioxide storage and the internal geometric structure of the storage box are as shown in FIG. 8.

Although the steps are described in the above-mentioned sequence in the above-mentioned embodiment, those skilled in the art can understand that in order to achieve the effect of the present embodiment, different steps do not need to be performed in such an order, but can be performed simultaneously (in parallel) or in reverse order, and these simple changes are within the scope of protection of the present invention.

A second embodiment of the present invention provides a system for optimally selecting the carbon storage site based on multi-frequency band seismic data, which comprises:

a data obtaining module configured for obtaining the original seismic data and well logging data of the known well site, then obtaining near-well geological interpretation results and three-dimensional post-stack seismic data, and obtaining the depth data of the maker layer of the target horizon and the isochronous three-dimensional distribution of the marker layer based on the three-dimensional post-stack seismic data;

a pretreatment module configured for eliminating the abnormal values and performing standardized pretreatment to obtain standardized well logging data based on the well logging data;

a spread spectrum simulation module configured for performing seismic wavelet spread spectrum simulation to obtain spread spectrum simulated wavelets based on the three-dimensional post-stack seismic data;

an isochronous stratigraphic framework model obtaining module configured for building the isochronous stratigraphic framework model of the target horizon, and calculating the geometric structure and spatial distribution of the fault-karst based on the spread spectrum simulated wavelets;

a Bimf component obtaining module configured for performing multi-scale decomposition to obtain multi-scale Bimf components of the seismic data based on the three-dimensional post-stack seismic data and the spread spectrum simulated wavelets;

a time-depth conversion relationship obtaining module configured for performing well-to-seismic calibration and ignoring small-scale Bimf components in the multi-scale Bimf components of the seismic data to obtain the time-depth conversion relationship based on the spread spectrum simulated wavelets and standardized well logging data;

a wave impedance inversion data volume obtaining module configured for performing waveform-indicated seismic wave impedance inversion to obtain a wave impedance inversion data volume based on the well logging data, the frequency-boosted seismic data and the time-depth conversion relationship, and on the basis of stratigraphic trend information provided by the isochronous stratigraphic framework model;

a stable stratum wave impedance data volume obtaining module configured for based on the three-dimensional post-stack seismic data, calculating a three-dimensional variance attribute volume, delineating the sedimentary stable area, selecting the virtual well site based on the sedimentary stable area, and obtaining the stable stratum wave impedance data volume through the virtual well cross-well wave impedance interpolation;

an abnormal wave impedance data volume obtaining module configured for calculating the difference between the stable stratum wave impedance data volume and the wave impedance inversion data volume to obtain the abnormal wave impedance data volume;

a fault-karst wave impedance data volume obtaining module configured for retaining the abnormal wave impedance data in the spatial geometric contour of the fault-karst by removing areas lower than the average value in the three-dimensional variance attribute volume to obtain the fault-karst wave impedance data volume including the geometric structure and internal wave impedance characteristics of the fault-karst; and a model interpretation module configured for comparing the near-well geological interpretation result with the fault-karst wave impedance data volume, delineating the characteristic value interval of the cave reservoir, the characteristic value interval of the fractured zone and the characteristic value interval of the surrounding rock, and obtaining the fault-karst reservoir bed interpretation model.

According to the fault-karst reservoir bed interpretation model, the migration and reservoir space is calculated after carbon dioxide injection, and a trap structure with the preset size threshold is found, so that the migration and reservoir space where the injected carbon dioxide is stored in a high-density free phase under the conditions of being blocked by tight carbonate rocks at the side of the fault zone and sealed by the top marl cover coat is selected as the position of a carbon storage box. A person skilled in the art can clearly understand that for convenience and conciseness of description, specific working processes and related explanations of the foregoing described system can refer to the corresponding processes in the foregoing method embodiments, and will not be repeated here.

It should be noted that the system for optimally selecting the carbon storage site based on multi-frequency band seismic data provided by the above embodiment is only exemplified by the division of the above-mentioned functional modules, in practical application, above functions may be allocated to different functional modules according to needs, that is, the modules or steps in the embodiment of the present invention can be decomposed or combined again; and for example, the modules in the above embodiments can be combined into one module or further split into multiple sub-modules to complete all or part of the above-mentioned functions. The names of the modules and steps involved in the embodiments of the present invention are only for distinguishing each module or step, and are not regarded as improper restrictions on the present invention.

Electronic equipment of the third embodiment of the present invention comprises at least one processor, and a memory communicatively connected to the at least one processor, wherein the memory stores instructions that can be executed by the processor, and the instructions are used to be executed by the processor to realize the method for optionally selecting the carbon storage site based on multi-frequency band seismic data.

A fourth embodiment of the present invention provides a computer-readable storage medium; and the computer-readable storage medium stores the computer instructions which are used to be executed by a computer to realize the method for optionally selecting the carbon storage site based on multi-frequency band seismic data.

What is claimed is:

1. A method for optimally selecting a carbon storage site based on multi-frequency band seismic data, comprising:

using well logging instruments to generate original seismic data and well logging data at a known well site;

configuring an electronic equipment, comprising at least one processor, and a memory communicatively connected to the at least one processor, wherein the memory stores instructions that can be executed by the processor, and the instructions are used to be executed by the processor to realize the steps of:

obtaining the original seismic data and well logging data of the known well site, and then obtaining near-well geological interpretation results and three-dimensional post-stack seismic data;

based on the three-dimensional post-stack seismic data, obtaining the depth data of a maker layer of a target horizon and the isochronous three-dimensional distribution of the marker layer;

based on the well logging data, eliminating the abnormal values and performing standardized pretreatment to obtain standardized well logging data;

based on the three-dimensional post-stack seismic data, performing seismic wavelet spread spectrum simulation to obtain spread spectrum simulated wavelets;

based on the spread spectrum simulated wavelets, building an isochronous stratigraphic framework model of a target horizon, and calculating the geometric structure and spatial distribution of the fault-karst;

based on the three-dimensional post-stack seismic data and the spread spectrum simulated wavelets, performing multi-scale decomposition to obtain multi-scale Bimf components of the seismic data;

based on the spread spectrum simulated wavelets and standardized well logging data, performing well-to-seismic calibration and ignoring small-scale Bimf components in the multi-scale Bimf components of the seismic data, thereby obtaining the time-depth conversion relationship;

based on the well logging data, the frequency-boosted seismic data, and the time-depth conversion relationship, and on the basis of stratigraphic trend information provided by the isochronous stratigraphic framework model, performing waveform-indicated seismic wave impedance inversion to obtain a wave impedance inversion data volume;

based on the three-dimensional post-stack seismic data, calculating a three-dimensional variance attribute volume, delimiting a sedimentary stable area, selecting a virtual-well site based on the sedimentary stable area, and obtaining a stable stratum wave impedance data volume through a virtual well cross-well wave impedance interpolation;

calculating the difference between the stable stratum wave impedance data volume and the wave impedance inversion data volume to obtain the abnormal wave impedance data volume, and highlighting the influence of the fault zone on the wave impedance of the stable sedimentary strata;

by removing areas lower than the average value in the three-dimensional variance attribute volume, retaining the abnormal wave impedance data in the spatial geometric contour of the fault-karst to obtain a fault-karst wave impedance data volume including the geometric structure and internal wave impedance characteristics of the fault-karst;

comparing the near-well geological interpretation result with the fault-karst wave impedance data volume, delineating a characteristic value interval of a cave reservoir, a characteristic value interval of a crack fractured zone, and a characteristic value interval of surrounding rock, and obtaining a fault-karst reservoir bed interpretation model; and according to a fault-karst reservoir bed interpretation model, calculating migration and reservoir space after carbon dioxide injection, and finding a trap structure with a preset size threshold value, so that the migration and reservoir space where the injected carbon dioxide is stored in a high-density free phase under the conditions of being blocked by the tight carbonate rocks at the side of the fault zone and sealed by a top marl cover coat is selected as the position of the carbon storage box.

2. The method for optimally selecting a carbon storage site based on multi-frequency band seismic data of claim 1, wherein a method of obtaining spread spectrum simulated wavelets comprises:

expressing a seismic record convolution model of the original seismic data in a frequency domain as:

$$s(\omega)=\sigma(\omega)\varepsilon(\omega)$$

where, $s(\omega)$ represents the seismic record frequency spectrum after Fourier transformation, $\sigma(\omega)$ represents the seismic wavelet frequency spectrum after Fourier transformation, $\varepsilon(\omega)$ represents the reflection coefficient frequency spectrum after Fourier transformation, and $\omega$ represents the angular frequency;

transforming the expression of the seismic record convolution model in the frequency domain into the expression in the frequency domain of a seismic record linear system:

$$\ln s(\omega)=\ln\sigma(\omega)+\ln\varepsilon(\omega)$$

where, $\ln s(\omega)$ is the expression in the frequency domain of the seismic record linear system, $\ln\varepsilon(\omega)$ is the expression in the frequency domain of a seismic wavelet linear system, and $\ln\varepsilon(\omega)$ is the expression in the frequency domain of a reflection coefficient linear system;

Fourier transformation is:

$$\tilde{s}(t)=\tilde{\sigma}(t)+\tilde{\varepsilon}(t)$$

where, $\tilde{s}(t)$ represents a complex cepstrum sequence of a seismic record frequency spectrum, $\tilde{\sigma}(t)$ represents a complex cepstrum sequence of a seismic wavelet frequency spectrum, $\tilde{\varepsilon}(t)$ represents a complex cepstrum sequence of a reflection coefficient spectrum, and t represents the arrival time of seismic waves;

separating the wavelet complex cepstrum sequence and the reflection coefficient complex cepstrum sequence in a complex cepstrum by a low-pass filter to extract wavelet amplitude;

based on the wavelet amplitude, simulating a seismic wavelet amplitude spectrum by the least square method:

$$\sigma(f)=A(f)f^{\alpha}e^{H(f)}$$

where, $\alpha$ represents a constant greater than or equal to 0, $\sigma(f)$ represents the seismic wavelet frequency spectrum, which is obtained from the Fourier transform of $\sigma(t)$, and H(f) and A(f) are polynomials about the frequency f to be solved, which are used to fit the seismic wavelet amplitude spectrum;

obtaining the maximum phase component and the minimum phase component of the wavelet based on the simulated seismic wavelet amplitude spectrum;

letting the maximum phase component of the wavelet σ(t) be u(t) and the minimum phase component be v(t), then the wavelet σ(t) is:

$$\sigma(t)=u(t)\cdot v(t)$$

the complex cepstrum of the amplitude spectrum is expressed as:

$$2\,\widetilde{\sigma_0}(t)=\tilde{u}(t)+\tilde{v}(t)+\tilde{u}(-t)+\tilde{v}(-t)$$

where, the complex cepstrum $\widetilde{\sigma_0}(t)$ of the amplitude spectrum is symmetrically displayed on positive and negative axes of the complex cepstrum, $\tilde{v}(-t)$ is the complex cepstrum of the maximum phase function corresponding to the minimum phase component v(t) of the seismic wavelet, and $\tilde{u}(t)$ is the complex cepstrum of the minimum phase function corresponding to the maximum phase component of the seismic wavelet; and determining a set of mixed-phase wavelet sets with the same amplitude spectrum based on the complex cepstrum of the amplitude spectrum, adjusting Yu wavelet parameters, raising the main frequency by keeping the low frequency and expanding the high frequency on the premise of ensuring the integrity of the main frequency of the seismic wavelet, and raising the effective bandwidth to the preset bandwidth threshold to obtain the spread spectrum simulated wavelets.

3. The method for optimally selecting a carbon storage site based on multi-frequency band seismic data of claim 1, wherein a method of obtaining the Bimf components of the seismic data comprises:

setting an initial pre-stack gather matrix;

$$r_0(x,y)=U(x,y)$$

where, x is the matrix row coordinate, y is the matrix column coordinate, U is the value of the post-stack three-dimensional seismic data, and $r_0$ is the matrix element value;

setting a variable l as the number of decomposed Bimf layers, and the initial value of l to 1, defining an initialization matrix variable as h, and obtaining a variable matrix h(x, y) as follows:

$$h(x,y)=r_{l-1}(x,y)$$

calculating the local maximum matrix and local minimum matrix about h(x, y);

observing with an observation matrix of a preset size in the variable matrix, extracting the element value in the observation matrix, and obtaining the maximum value of the observation matrix, wherein the small matrix with the preset size of 4×4 can be used for observation;

sliding the observation matrix until the center of the observation matrix traverses all matrix variables h, and assigning the measured maximum value of the observation matrix to the central element position of the corresponding observation matrix to obtain a local maximum matrix Max(x, y);

obtaining the minimum value in the observation matrix by setting the observation matrix, and then obtaining a local minimum matrix Min(x, y);

obtaining the maximum envelope surface and the minimum envelope surface by a spline interpolation method;

the interpolation formula is:

$$N(i+m_{model},j+n_{model})=ABC$$

where, A, B, and C represent an interpolation transition matrix:

$$A = [\,\delta(1+m_{model})\ \ \delta(m_{model})\ \ \delta(1-m_{model})\ \ \delta(2-m_{model})\,]$$

$$B = \begin{bmatrix} \text{Max}(i-1,j-2) & \text{Max}(i,j-2) & \text{Max}(i+1,j-2) & \text{Max}(i+2,j-2) \\ \text{Max}(i-1,j-1) & \text{Max}(i,j-1) & \text{Max}(i+1,j-1) & \text{Max}(i+2,j-1) \\ \text{Max}(i-1,j) & \text{Max}(i,j) & \text{Max}(i+1,j) & \text{Max}(i+2,j) \\ \text{Max}(i-1,j+1) & \text{Max}(i,j+1) & \text{Max}(i+1,j+1) & \text{Max}(i+2,j+1) \end{bmatrix}$$

$$C = [\,\delta(1+n_{model})\ \ \delta(n_{model})\ \ \delta(1-n_{model})\ \ \delta(2-n_{model})\,]$$

where, $m_{model}$ and $n_{model}$ are preset values greater than 0 and less than 1, and 8 is the spread spectrum simulated wavelet;

obtaining $N_{Max}$ as the maximum envelope surface, replacing the local maximum matrix Max(x, y) in a transition formula B with the local minimum matrix Min(x, y), and obtaining Min(x, y) as the minimum envelope surface;

calculating the average value of the maximum envelope surface and the minimum envelope surface to obtain the intermediate transition quantity;

$$m_{l-1}(x,y)=[N_{max}(x,y)+\text{Min}(x,y)]/2$$

subtracting the intermediate transition quantity from the variable matrix h(x, y) to obtain the Bimf components of the J-th layer corresponding to the seismic data;

$$Bimf_l(x,y)=h(x,y)-m_{l-1}(x,y)$$

obtaining the margin $r_{l-1}$ as an input variable for calculating the Bimf components of the next layer;

$$r_l(x,y)=r_{l-1}(x,y)-Bimf_l(x,y)$$

where, $r_l$ represents the margin of the l-th layer, l−1 represents the margin of the l−1-th layer, and the margin of l−1-th layer serves as an input variable for calculating the Bimf components of the l-th layer;

calculating the Bimf components iteratively until the termination condition is met:

$$\sum_{x=1}^{M}\sum_{y=1}^{N}\left[\frac{|Bimf_l(x,y)-Bimf_{l-1}(x,y)|^2}{Bimf_{l-1}^2(x,y)}\right] \le r;$$

and obtaining the multi-scale Bimf components of the seismic data, where, r is the preset termination threshold.

4. The method for optimally selecting a carbon storage site based on multi-frequency band seismic data of claim 1, wherein a method of obtaining the time-depth conversion relationship comprises:

performing product operation based on a sonic time difference curve and a density curve in the well logging data of each known well site to obtain a wave impedance curve, and further calculating a reflection coefficient curve;

constructing a Ricker wavelet on the basis of the main seismic frequency of a target interval, and performing convolution calculation of the Ricker wavelet and the reflection coefficient curve to obtain the synthetic seismic record;

making the depth data of the maker layer at the wellbore of each drilling well position correspond to the isochronous three-dimensional distribution of the maker layer, calculating the correlation between the synthetic seismic record and the spread spectrum simulated wavelets of a seismic trace near the well, when the waveform correlation is higher than the first correlation threshold, and the preliminary well-to-seismic calibration is completed to obtain the preliminary time-depth conversion relationship between the well logging depth and the two-way travel time of seismic reflection waves;

$$T_d = T_{H_0} + 2 \sum_{i_{|\overline{\text{目}}|}=1}^{z_{|\overline{\text{目}}|}} T_{i_{|\overline{\text{目}}|}} \cdot \Delta H$$

where, $T_{H_0}$ represents the two-way travel time of the seismic data corresponding to the depth of the sonic well logging marker layer; $T_{i_{|\overline{\text{目}}|}}$ represents the sonic time difference; $\Delta H$ represents the well logging curve data sampling interval; $T_d$ represents the two-way travel time of the seismic wave;

adding the Bimf components of the seismic data step by step in descending order of scale to obtain updated effective seismic data;

adding a Bimf component every time to obtain the updated effective seismic data, and calculating the second correlation between the synthetic seismic records after one time updating and the effective seismic data;

as the Bimf components are gradually added to the effective seismic data, the second correlation shows an upward trend at first, and when the second correlation shows a downward trend, the updated synthetic seismic record at the peak of the second correlation and the updated earthquake are taken to calculate the second time-depth conversion relationship; and taking the second time-depth conversion relationship as the finally measured time-depth conversion relationship.

5. The method for optimally selecting a carbon storage site based on multi-frequency band seismic data of claim 1, wherein a method of obtaining a wave impedance inversion data volume comprises:

based on the spread spectrum simulated wavelets, calculating the waveform correlation between the waveform of the seismic trace to be discriminated and the synthetic seismic record of the known well, and establishing an initial model according to the wave impedance curve corresponding to the well with the highest waveform correlation;

using white noise to satisfy the law of Gaussian distribution, and expressing the wave impedance data in well logging data as:

$$Y_{sim} = X_{sim} + \xi$$

where, $Y_{sim}$ represents the well logging wave impedance curve, $X_{sim}$ represents the actual wave impedance value of the underground stratum to be solved, and represents random noise;

according to the central limit theorem, $\|X_{sim} - X_p\|^2$ also satisfies the Gaussian distribution, determining the initial objective function as:

$$J_1 = \frac{\|X_{sim} - X_p\|^2}{2\sigma^2}$$

where $J_1$ represents the function related to posterior information, $X_p$ represents the selection of a wave impedance curve of a sample well to a sample well based on the optimal number of samples, after matched filtering, posterior probability statistical distribution density is obtained, then the expected wave impedance value is calculated, and $\sigma^2$ represents the covariance of white noise;

based on the initial objective function, introducing prior information into the objective function through maximum posterior estimation to obtain a stable objective function as follows:

$$J(Z_{sim}) = J_1(Z_{sim}) + \lambda^2 J_2(Z_{sim})$$

where, $Z_{sim}$ represents the characteristic parameter to be simulated, $J_2$ represents the function related to the prior information of geological and well logging data, and $\lambda$ represents the smoothing parameter used to coordinate the interaction between $J_1$ and $J_2$; and taking the stable objective function as the input of the initial model, sampling the posterior probability distribution by a Markov chain Monte Carlo method (MCMC) and Metropolis-Hastings sampling criterion, continuously optimizing the parameters of the initial model, selecting the solution when the objective function takes the maximum value as a value randomly realized, taking the average value randomly realized many times as the expected value output, and taking the expected value output as the wave impedance inversion data volume.

6. The method for optimally selecting a carbon storage site based on multi-frequency band seismic data of claim 1, wherein a method of delineating the sedimentary stable area specifically comprises:

letting the data of each sampling point in the three-dimensional post-stack seismic data be $S_{pqk}$ where p represents the seismic gird wire size, q represents the seismic grid trace number, and k represents the sampling point serial number of seismic records sampled at 1 ms;

calculating the mean square error of sampling point data in a preset sampling area:

$$Q_{pqk} = \sum_{p-1}^{p+1} \sum_{q-1}^{q+1} \sum_{k-1}^{k+1} \left( S_{pqk} - 1/9 \sum_{p-1}^{p+1} \sum_{q-1}^{q+1} \sum_{k-1}^{k+1} S_{pqk} \right)^2$$

translating the sampling areas vertically and horizontally, transversely calculating the data mean square errors of all the sampling areas to obtain a three-dimensional variance attribute volume; and slicing the three-dimensional variance attribute volume, obtaining the distribution characteristics of variance attribute data on the plane, and taking the area where the variance attribute value is lower than the total energy average value as the sedimentary stable area.

7. The method for optimally selecting a carbon storage site based on multi-frequency band seismic data of claim 1, wherein a method of obtaining the stable stratum wave impedance data volume comprises:

delineating grids with preset sizes based on the sedimentary stable area, and taking each grid node as a virtual well site;

letting the unknown underground wave impedance model parameter m be the g-dimensional space vector m={$m_1, \ldots, m_g$};

through an earthquake acquisition process, obtaining the observation data D as a K-dimensional data vector d={$d_1, \ldots, d_k$};

through a nonlinear function kernel G, establishing an unknown underground wave impedance model parameter, and establishing the relationship between the parameter and the K-dimensional data vector to obtain a forward model:

$$d=G(m)+n$$

where, n={$n_1, \ldots, n_k$} represents random noise independent of the underground wave impedance model parameter m, which obeys Gaussian distribution;

constructing the inversion objective function based on the forward model:

$$\min F[d, G(m)] = \min \|d, G(m)\|_2^2$$

where, F is the mean square error between the observation data d and the predicted data G(m);

performing linearized solution on the inversion objective function;

performing Taylor expansion on the forward model and omitting higher-order terms of more than quadratic to obtain a brief expression of prediction data:

$$\Delta G(m)=G(m)-G(m^0)=A\Delta m=A(m-m^0),$$

where, $m^0$ represents the initial model established according to prior information, A is a Jacobian matrix, and the element of A is first-order partial differential $\partial G_i/\partial m_j$;

letting $d_0=G(m_0)+\xi_2$, $\Delta d=d-d_0$, $\xi_2$ represent random noise, then the iterative equation of the forward model is:

$$m^{t+1}=m^t+\Delta m,$$

where, $m^t$ represents the forward model after iteration t times, $m^{t+1}$ represents the forward model after iteration t+1 times, and $d_0$ is the noise-adding predicted data;

obtaining a pre-stack depth and an offset seismic profile d' through a seismic acquisition process, assuming that the inversion depth domain model parameters have prior probability distribution P(M=m), according to Bayesian formula, the probability distribution is as follows:

$$P(M=m|D=d') = \frac{P(D=d'|M=m)P(M=m)}{P(D=d')}$$

the probability distribution of adding random noise is follows:

$$P(D=d'|M=m) =$$

$$P(n) = \frac{1}{(2\pi)^{\frac{n}{2}}|\det C_n|^{\frac{1}{2}}} \exp\{-[d'-G(m)]^T C_n^{-1}[d'-G(m)]\}$$

where, $C_n$ is the noise covariance matrix, $C_n^{-1}$ is the inversion operation of a noise covariance matrix, and det is the determinant of the corresponding matrix;

n is noise and obeys Gaussian distribution, the average value is 0, $C_n$ is an equivalent diagonal matrix, and diagonal elements are the variance a containing noise of data center, then the probability distribution of adding the random noise is deformed as follows:

$$P(D=d'|M=m) = \prod \frac{1}{(2\pi)^{\frac{n}{2}}\sigma_n} \exp\{-\sigma_n^2 \sum [d'-G(m)]^2\}$$

for the prior probability distribution P(M=m) of the inversion depth domain model parameter, setting the initial model $m^0$, there is $m=m^0+\Delta m$, and the equivalent depth domain model probability distribution is: P(M=m)=P(m=$m^0+\Delta m$)=P($\Delta m=m-m^0$);

letting the probability distribution of the equivalent depth domain model obey Gaussian distribution, and the probability distribution of the depth domain model with the random noise added is:

$$P(M=m) = \frac{1}{(2\pi)^{\frac{n}{2}}|\det C_{\Delta m}|^{1/2}} \exp\{-[m-m^0]^T C_{\Delta m}^{-1}[m-m^0]\}$$

assuming that the average value of the depth domain model parameters is equal to the initial model $m^0$, and they do not affect each other, there is a simplified probability distribution of the depth domain model, which is as follows:

$$P(M=m) = \frac{1}{(2\pi)^{\frac{n}{2}}\sigma_m} \exp\{-\sigma_m^2[m-m^0]\}$$

where, $\sigma_m^2$ represents the variance value of the real model relative to the given initial model;

a denominator P(D=d') in the probability distribution deformation added with the random noise added depends on data acquisition and processing, and is set as a constant, and maximizing posterior probability is equivalent to maximizing a numerator, which maximizes posterior probability distribution:

$$P(M=m|D=d') =$$

$$\prod \frac{1}{(2\pi)^n \sigma_n \sigma_m} \exp\{-\sigma_n^{-2}\sum[d'-G(m)]^2 - \sigma_m^2\sum[m-m^0]^2\}$$

making the maximum equivalent formula of posterior probability distribution as:

$$F(m)=\sigma_n^{-2}\Sigma[d'-G(m)]^2+\sigma_m^2\Sigma[m-m^0]^2 \to 0$$

letting the partial derivative of the model parameter m equal to zero, and $G(m)=G(m^0)+A\Delta m$, $\Delta m=m-m^0$, thereby obtaining the matrix equation:

$$\frac{\partial F(m)}{\partial m} = \sigma_n^{-2}[d'-G(m^0)-A\Delta m]IA - \sigma_m^2 I\Delta m = 0$$

$$d'I\sigma_n^{-2}A - \sigma_m^2 I\Delta m - G(m^0)\sigma_n^{-2}IA - A\Delta m I\sigma_n^{-2}A = 0$$

where, $$A_{ij} = \frac{\partial G_i}{\partial m_j},$$

I is an identity matrix, Δm is a wave impedance iterative matrix, arranging to obtain the basic formula of random inversion as follows:

$$[d'-G[m^0]]A=[AA^T+\sigma_n^2\sigma_m^{-2}I]\Delta m$$

$$\Delta m=[AA^T+\sigma_n^2\sigma_m^{-2}I]^{-1}A^T[d'-G(m^0)]$$

the iterative formula of the basic formula of random inversion is: $m^{t+1}=m^t+\Delta m$;

where, $G[m^0]$ is the depth domain synthetic seismic record formed by the parametric model;

updating the parameters of the unknown underground wave impedance model through continuous iteration until positive and negative shocks occur in Δm, where, m t+1 is low frequency wave impedance inversion data;

based on the correlation between the plane coordinates of the virtual well site and the plane coordinates of the seismic data, further determining the one-to-one correspondence between the virtual well and the low-frequency wave impedance inversion data, and then assigning the low frequency wave impedance inversion data beside the virtual well to the virtual well to obtain the wave impedance data of the virtual well site; and based on the wave impedance inversion data volume, extracting the wave impedance data of the virtual well site, setting the calculation area as the whole range of the work area in the geological framework according to the interpolation calculation of all virtual well wave impedance data in the time window range defined by the stratigraphic framework to obtain the stable stratigraphic wave impedance data.

8. A non-transitory computer-readable storage medium stores computer instructions which are used to be executed by a computer to realize the method for optimally selecting the carbon storage site based on multi-frequency band seismic data of claim 1.

9. A system for optimally selecting a carbon storage site based on multi-frequency band seismic data, comprising:

well logging instruments configured to generate original seismic data and well logging data of a known well site;

a data obtaining module configured for obtaining the original seismic data and well logging data of the known well site, then obtaining near-well geological interpretation results and three-dimensional post-stack seismic data, and obtaining the depth data of a maker layer of a target horizon and the isochronous three-dimensional distribution of the marker layer based on the three-dimensional post-stack seismic data;

a pretreatment module configured for eliminating the abnormal values and performing standardized pretreatment to obtain standardized well logging data based on the well logging data;

a spread spectrum simulation module configured for performing seismic wavelet spread spectrum simulation to obtain spread spectrum simulated wavelets based on the three-dimensional post-stack seismic data;

an isochronous stratigraphic framework model obtaining module configured for building an isochronous stratigraphic framework model of a target horizon, and calculating the geometric structure and spatial distribution of the fault-karst based on the spread spectrum simulated wavelets;

a Bimf component obtaining module configured for performing multi-scale decomposition to obtain multi-scale Bimf components of the seismic data based on the three-dimensional post-stack seismic data and the spread spectrum simulated wavelets;

a time-depth conversion relationship obtaining module configured for performing well-to-seismic calibration and ignoring small-scale Bimf components in the multi-scale Bimf components of the seismic data to obtain the time-depth conversion relationship based on the spread spectrum simulated wavelets and standardized well logging data;

a wave impedance inversion data volume obtaining module configured for performing waveform-indicated seismic wave impedance inversion to obtain a wave impedance inversion data volume based on the well logging data, the frequency-boosted seismic data and the time-depth conversion relationship, and on the basis of stratigraphic trend information provided by the isochronous stratigraphic framework model;

a stable stratum wave impedance data volume obtaining module configured for based on the three-dimensional post-stack seismic data, calculating a three-dimensional variance attribute volume, delineating the a sedimentary stable area, selecting the virtual-well site based on the sedimentary stable area, and obtaining the stable stratum wave impedance data volume through the virtual well cross-well wave impedance interpolation;

an abnormal wave impedance data volume obtaining module configured for calculating the difference between the stable stratum wave impedance data volume and the wave impedance inversion data volume to obtain the abnormal wave impedance data volume;

a fault-karst wave impedance data volume obtaining module configured for retaining the abnormal wave impedance data in the spatial geometric contour of the fault-karst by removing areas lower than the average value in the three-dimensional variance attribute volume to obtain the fault-karst wave impedance data volume including the geometric structure and internal wave impedance characteristics of the fault-karst;

a model interpretation module configured for comparing the near-well geological interpretation result with the fault-karst wave impedance data volume, delineating the characteristic value interval of a cave reservoir, the characteristic value interval of a fractured zone and the characteristic value interval of a surrounding rock, and obtaining a fault-karst reservoir bed interpretation model; and according to a fault-karst reservoir bed interpretation model, the migration and reservoir space is calculated after carbon dioxide injection, and a trap structure with the preset size threshold value is found, so that the migration and reservoir space where the injected carbon dioxide is stored in a high-density free phase under the conditions of being blocked by the tight carbonate rocks at the side of the fault zone and sealed by a top marl cover coat is selected as the position of the carbon storage box.

\* \* \* \* \*